United States Patent [19]

Kawamura et al.

[11] Patent Number: 4,598,033

[45] Date of Patent: Jul. 1, 1986

[54] PHOTOCONDUCTIVE COMPOSITIONS COMPRISING A DISAZO COMPOUND

[75] Inventors: Kouichi Kawamura; Seiji Horie; Naonori Makino; Hideo Sato, all of Kanagawa, Japan

[73] Assignee: Fuji Photo Film Co., Ltd., Kanagawa, Japan

[21] Appl. No.: 660,572

[22] Filed: Oct. 12, 1984

[30] Foreign Application Priority Data

Oct. 13, 1983 [JP] Japan .................................. 58-191244

[51] Int. Cl.[4] .............................................. G03G 5/06
[52] U.S. Cl. ........................................ 430/75; 430/76; 430/78
[58] Field of Search ........................ 430/76, 75, 78, 58

[56] References Cited

U.S. PATENT DOCUMENTS 4,327,020  4/1982  Sasaki et al. ........................ 430/76 X

*Primary Examiner*—John D. Welsh
*Attorney, Agent, or Firm*—Sughrue, Mion, Zinn, Macpeak & Seas

[57] ABSTRACT

A photoconductive composition comprising at least one disazo compound represented by the following general formula (I):

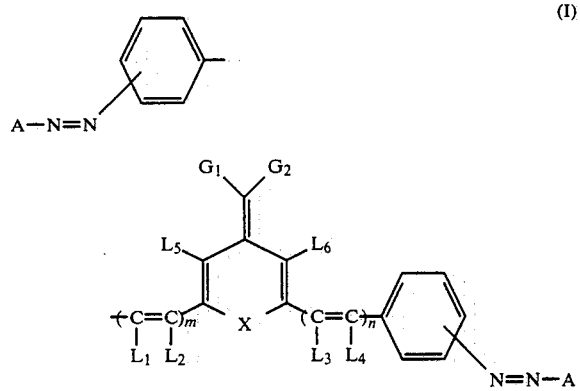

wherein X, $L_1$, $L_2$, $L_3$, $L_4$, $L_5$, $L_6$, A, m and n are as defined in the description and an electrophotographic light-sensitive material containing the disazo compound are disclosed.

The disazo compound is effective for improving both sensitivity and durability of the light-sensitive material.

47 Claims, 1 Drawing Figure

PHOTOCONDUCTIVE COMPOSITIONS COMPRISING A DISAZO COMPOUND

FIELD OF THE INVENTION

The present invention relates to photoconductive compositions containing novel disazo compounds and particularly to photoconductive compositions suitable for producing electrophotographic light-sensitive materials having high sensitivity.

BACKGROUND OF THE INVENTION

The photoconduction process using electrophotographic light-sensitive materials requires
(1) a step of generating electric charges by exposure, and
(2) a step of transferring electric charges.

Steps (1) and (2) can be conducted using the same substance, such as a selenium light-sensitive plate. Alternatively, steps (1) and (2) can be performed using different substances, such as a combination of amorphous selenium and poly-N-vinylcarbazole, respectively. Using different substances in steps (1) and (2) has the advantage that the selection of substances used for electrophotographic light-sensitive materials is widely extended and, consequently, the electrophotographic characteristics of the electrophotographic light-sensitive materials, such as sensitivity or acceptive electric potential, can be improved.

Conventional substances used as the photoconductive raw materials for electrophotographic light-sensitive materials used for electrophotography include inorganic substances such as selenium, cadmium sulfide or zinc oxide.

The electrophotographic process as disclosed by Carlson in U.S. Pat. No. 2,297,691 uses a photoconductive material comprising a base coated with a substance that is electrically insulative before exposure to light, having an electric resistance which changes according to the amount of imagewise exposure to light. This photoconductive material is generally uniformly charged to form a surface electric charge after being subjected to dark adaptation for a suitable time. Then it is imagewise exposed to light having the effect of reducing the surface electric charges according to the relative energy of the various parts of the image exposed. The reisdual surface electric charge or electrostatic latent image on the surface of the photoconductive substance layer (electrophotographic light-sensitive layer) is then brought into contact with a suitable electroscopic indicating substance, namely, a toner to form visible images.

The toner is contained in an insulating liquid or a dried carrier. In any case, it can be adhered to the surface of the electrophotographic light-sensitive layer according to the electric charge pattern. The adhered indicating substance can be fixed by known means such as heat, pressure or vapor of a solvent. Further, the electrostatic latent image can be transferred to a second support (for example, paper or film, etc.). In addition, the electrostatic latent images can be developed on the second support after being transferred. The electrophotographic process is an image forming process in which images are formed as described above.

In such an electrophotographic process, the fundamental characteristics required for electrophotographic light-sensitive materials are (1) that they can be electrically charged in the dark to have a suitable electric potential, (2) that the rate of discharge of the electric charges in the dark is low, and (3) that the electric charges can be discharged quickly by exposing to light.

The above-described conventional inorganic substances have many advantages but they have various disadvantages. For example, selenium, which is widely used at present, satisfies the above requirements (1) to (3), but it has the disadvantage that its production is difficult aand involves increased production costs, it is lacking in flexibility and can only be formed into belt shape with difficulty, and it must be handled carefully, because it is very sensitive to heat or mechanical impact. Cadmium sulfide and zinc oxide have been used as electrophotographic light-sensitive materials dispersed in a resin binder. However, they cannot be used repeatedly because of mechanical faults in smoothness, hardness, tensile strength or friction resistance, etc.

In recent years, in order to overcome the disadvantage of such inorganic substances, electrophotographic light-sensitive materials using organic substances have been developed and some of them have been put into practical use, including electrophotographic light-sensitive materials composed of poly-N-vinylcarbazole and 2,4,7-trinitrofluoroen-9-one (U.S. Pat. No. 3,484,237), those having poly-N-vinylcarbazole sensitized by pyrylium dyes (Japanese Patent Publication No. 25658/73), electrophotographic light-sensitive materials containing an organic pigment as a chief component (Japanese Patent Application (OPI) No. 37543/72 (the term "OPI" as used herein refers to a "published unexamined Japanese patent application")) and electrophotographic light-sensitive materials containing eutectic complex composed of a dye and a resin as a chief component (Japanese Patent Application (OPI) No. 10735/72).

Although the mechanical characteristics and flexibility of these organic electrophotographic light-sensitive materials can be improved to some extent over those of inorganic electrophotographic light-sensitive materials, they have low light sensitivity and are not suitable for repeated use. Accordingly, they are insufficiently practical for use as electrophotographic light-sensitive materials.

SUMMARY OF THE INVENTION

As a result of studies directed to overcoming the disadvantages of conventional electophotographic light-sensitive materials, the present inventors have found that electrophotographic light-sensitive materials having both high sensitivity and high durability sufficient for practical use can be produced containing a novel disazo dye.

The present invention relates to photoconductive compositions containing novel disazo compounds (disazo pigments) represented by the following general formula (I):

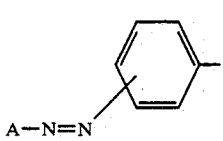

(I)

-continued

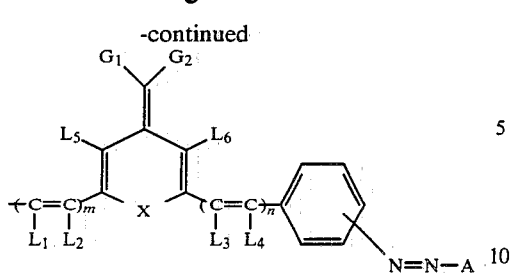

In the above-described general formula, the azo group is bonded at any of ortho, meta and para positions of the benzene rings, X represents O, S, Se or NR (wherein R represents a substituted or unsubstituted alkyl, aryl, aralkyl, cycloalkyl, alkoxy, aryloxy, acyl, alkenyl, alkynyl or alkylene group, and the substitutents of R include hydroxy, alkoxy, aryloxy or halogen);

m and n, which may be the same or different, each represents 0, 1 or 2;

$L_1$, $L_2$, $L_3$ and $L_4$, which may be the same or different, each represents a hydrogen atom, an alkyl group or an aryl group, or $L_2$ or $L_3$ represents an atomic group necessary to complete a carbon ring together with $L_5$ or $L_6$;

$L_5$ and $L_6$ each represents a hydrogen atom or an atomic group necessary to complete a carbon ring together with $L_2$ or $L_3$;

$G_1$ and $G_2$, which may be the same or different, each represents an electron attracting group or a non-metal atomic group necessary to form a carbon or heterocyclic ring including the carbon atom to which $G_1$ and $G_2$ are bonded;

provided that when $G_1$ and $G_2$ form a cyclic carbon nucleus or a heterocyclic nucleus together with the carbon atom to which they are bonded, the ring formed may be substituted with a substituent selected from the group consisting of substituted or unsubstituted alkyl, aryl, aralkyl, cycloalkyl, alkenyl, alkynyl, dialkylamino, diarylamino and diaralkylamino groups;

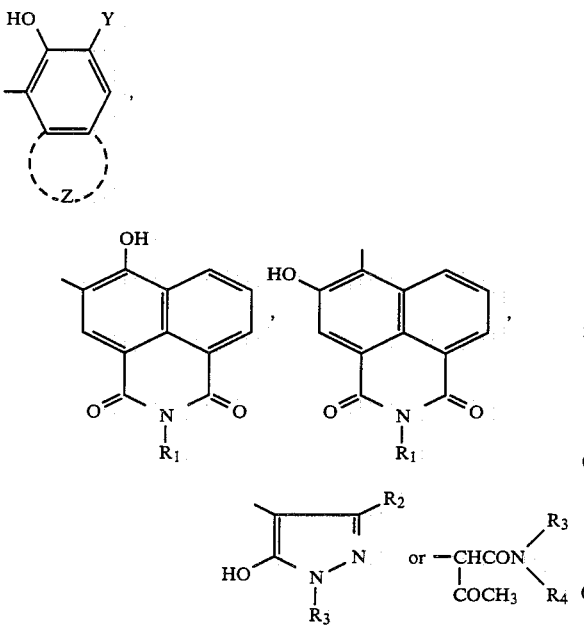

wherein

Z represents an atomic group necessary to form an aromatic ring including a naphthalene ring or an anthracene ring or a heterocyclic ring including an indole ring, a carbazole ring, a benzocarbazole ring or a dibenzofuran ring (which may be substituted or unsubstituted) which is condensed with the benzene ring in the above described formula, to which the hydroxyl group and Y bond;

Y represents

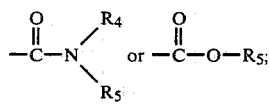

$R_1$ represents a hydrogen atom, a substituted or unsubstituted alkyl group or a substituted or unsubstituted phenyl group;

$R_2$ represents a hydrogen atom, a lower alkyl group, a carbamoyl group, a carboxyl group, an alkoxycarbonyl group, an aryloxycarbonyl group or a substituted or unsubstituted amino group;

$R_3$ and $R_5$ each represents a hydrogen atom, an alkyl group, an aromatic group such as a phenyl group, a naphthyl group or an anthryl group, a heteroaromatic group such as a dibenzofuranyl group, a carbazolyl group, a benzocarbazolyl group or an indolyl group, or a substituted alkyl, aromatic or heteroaromatic group thereof; and $R_4$ represents a hydrogen atom, a substituted or unsubstituted alkyl group or a substituted or unsubstituted phenyl group.

DETAILED DESCRIPTION OF THE INVENTION

Figure 1:
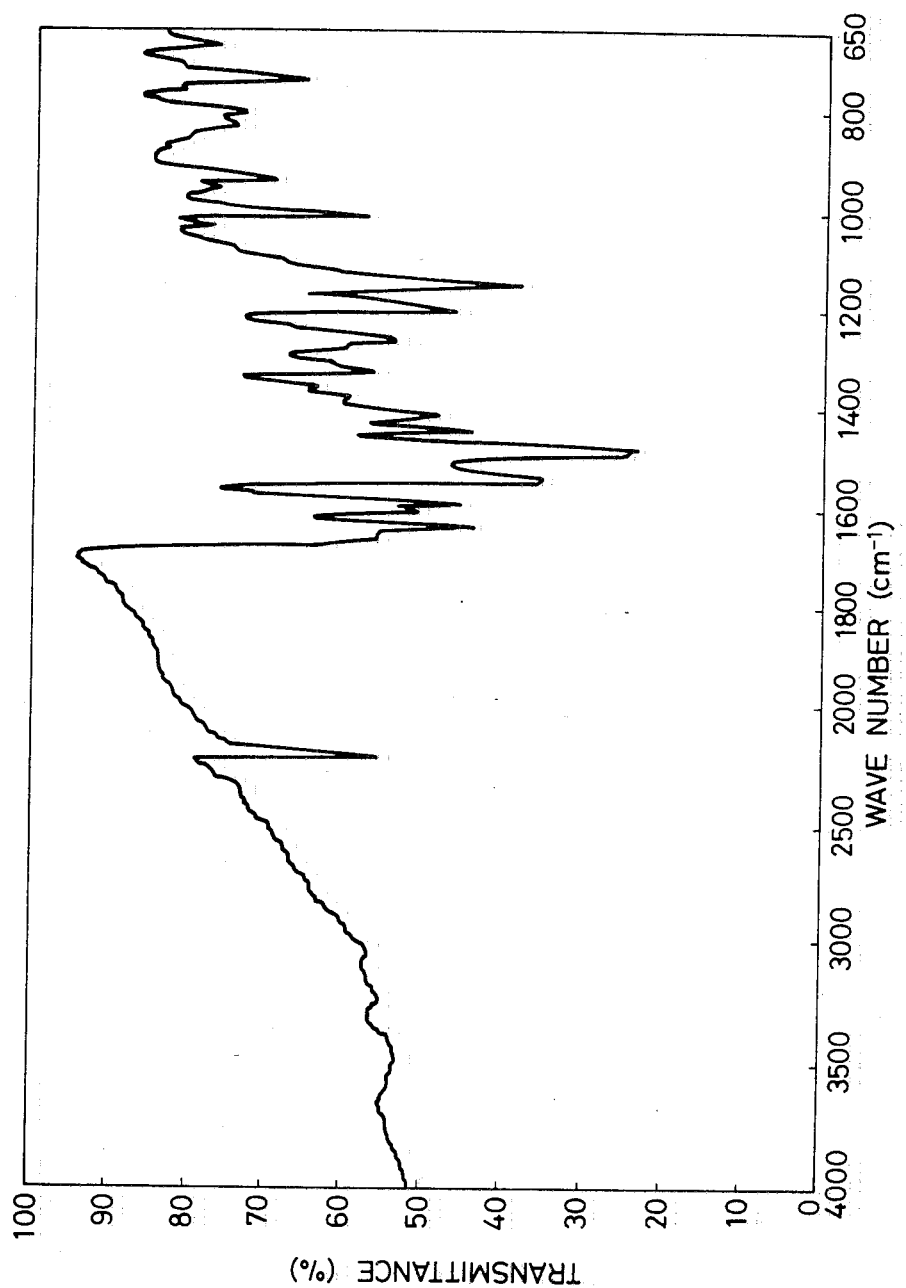
FIG. 1 shows an infrared absorption spectrum of disazo compound (1) of the present invention (KBr process).

Disazo compounds represented by general formula (I) are now described in greater detail.

When $G_1$ and $G_2$ represent electron attracting groups, examples include a cyano group, an acyl group having 2 to 10 carbon atoms and preferably 2 to 5 carbon atoms, an alkoxycarbonyl group having 2 to 10 carbon atoms and preferably 2 to 5 carbon atoms, a nitroaryl group having 6 to 15 carbon atoms and preferably 6 to 10 carbon atoms, an alkylsulfonyl group having 1 to 10 carbon atoms and preferably 1 to 5 carbon atoms, an arylsulfonyl group having 6 to 15 carbon atoms and preferably 6 to 10 carbon atoms and a nitro group.

When $G_1$ and $G_2$ represent non-metal atomic groups capable of combining to form a 3- to 7-membered, preferably 5- or 6-membered ring, examples include the following non-metal atomic groups:

(1) Non-metal atomic groups capable of combining to form a substituted or unsubstituted acid carbon nucleus used for merocyanine dyes, such as 1,3-indanedione, 1,3-cyclohexanedione, 5,5-dimethyl-1,3-cyclohexanedione or 1,3-dioxane-4,6-dione, which include the carbon atom to which $G_1$ and $G_2$ are bonded.

(2) Non-metal atomic groups capable of combining to form a substituted or unsubstituted acid heterocyclic nucleus containing 5 or 6 atoms in the ring, such as, for example, the following (a) to (q), which include the carbon atom to which $G_1$ and $G_2$ are bonded.

(a) Pyrazolinone nuclei such as 3-methyl-1-phenyl-2-pyrazoline-5-one, 1-phenyl-2-pyrazoline-5-one or 1-(2-benzothizolyl)-3-methyl-2-pyrazoline-5-one, (b) Isoxazolinone nuclei such as 3-phenyl-2-isoxazoline-5-one or 3-methyl-2-isoxazoline-5-one, (c) Hydroxyindole nuclei such as 1-alkyl-2,3-dihydro-2-hydroxyindole, (d) 2,4,6-Triketohexahydropyrimidine nuclei such as barbituric acid or 2-thiobarbituric acid, or a derivative of the above-described 2,4,6-triketohexahydropyrimidine nucleus having substituent groups such as 1-alkyl (for example, 1-methyl, 1-ethyl, 1-n-propyl or 1-n-heptyl), 1,3-dialkyl (for example, 1,3-dimethyl, 1,3-diethyl, 1,3-di-n-propyl, 1,3-diisopropyl, 1,3-dicyclohexyl or 1,3-di($\beta$-methoxyethyl)), 1,3-diaryl (for example, 1,3-diphenyl, 1,3-di(p-chlorophenyl), or 1,3-di(p-ethoxycarbonylphenyl)), 1-aryl (for example, 1-phenyl, 1-p-chlorophenyl or 1-p-ethoxycarbonylpheny) or 1-alkyl-3-aryl (for example, 1-ethyl-3-phenyl or 1-n-heptyl-3-phenyl), (e) 2-Thio-2,4-thiazolidinedione nuclei such as rhodanine, 3-alkylrhodanine (for example, 3-ethylrhodanine or 3-allyl-rhodanine) or 3-arylrhodanine (for example, 3-phenyl-rhodanine), (f) 2-Thio-2,4-oxazolidinedione (2-thio-2,4(3H,5H)oxazoledione) nuclei such as 3-ethyl-2-thio-2,4-oxazolidinedione.

(g) Thianaphthenone nuclei such as 3(2H)-thianaphthenone or 3(2H)-thianaphthenone-1,1-dioxide, (h) 2-Thio-2,5-thiazolidinedione (2-thio-2,5-(3H,4H)-thiazoledione) nuclei such as 3-ethyl-2-thio-2,5-thiazolidinedione, (i) 2,4-Thiazolidinedione nuclei such as 2,4-thiazolidinedione, 3-ethyl-2,4-thiazolidinedione, 3-phenyl-2,4-thiazolidinedione or 3-$\alpha$-naphthyl-2,4-thiazolidinedione, (j) Thiazolidinone nuclei such as 4-thiazolidinone, 3-ethyl-4-thiazolidinone, 3-phenyl-4-thiazolidinone or 3-$\alpha$-naphthyl-4-thiazolidinone, (k) 4-Thiazolinone nuclei such as 2-ethylmercapto-5-thiazoline-4-one, 2-alkylphenylamino-5-thiazoline-4-one or 2-diphenylamino-5-thiazoline-4-one, (l) 2-Imino-2-oxazoline-4-one pseudohydantoin nuclei, (m) 2,4-Imidazolidinedione (hydantoin) nuclei such as 2,4-imidazolidinedione, 3-ethyl-2,4-imidazolidinedione, 3-phenyl-2,4-imidazolidinedione, 3-$\alpha$-naphthyl-2,4-imidazolidinedione, 1,3-diethyl-2,4-imidazolidinedione, 1-ethyl-3-$\alpha$-naphthyl-2,4-imidazolidinedione or 1,3-diphenyl-2,4-imidazolidinedione, (n) 2-Thio-2,4-imidazolidinedione (2-thiohydantoin) nuclei such as 2-thio-2,4-imidazolidinedione, 3-ethyl-2-thio-2,4-imidazolidinedione, 3-phenyl-2-thio-2,4-imidazolidinedione, 3-$\alpha$-naphthyl-2-thio-2,4-imidazolidinedione, 1,3-diethyl-2-thio-2,4-imidazolidinedione, 1-ethyl-3-phenyl-2-thio-2,4-imidazolidinedione, 1-ethyl-3-$\alpha$-naphthyl-2-thio-2,4-imidazolidinedione or 1,3-diphenyl-2-thio-2,4-imidazolidinedione, (o) 2-Imidazoline-5-one nuclei such as 2-n-propylmercapto-2-imidazoline-5-one, (p) Furan-5-one, and (q) heterocyclic nuclei containing 5 atoms in the ring (wherein 3 atoms are carbon atoms, one is a nitrogen atom, and the other is selected from nitrogen, oxygen and sulfur).

When $G_1$ and $G_2$ combine to form a nucleus having substituents, the substituents may be substituted further with one or more hydroxyl, alkoxy (having 1 to 10 carbon atoms and preferably 1 to 5 carbon atoms), aryloxy (having 6 to 15 carbon atoms and preferably 6 to 10 carbon atoms) or halogen groups or acid substituted alkyl (having 1 to 10 carbon atoms and preferably 1 to 5 carbon atoms) or aryl (having 6 to 15 carbon atoms and preferably 6 to 10 carbon atoms) groups such as carboxymethyl, 5-carboxyphenyl, 2-sulfoethyl, 3-sufatopropyl, 3-thiosulfatopropyl, 2-phosphonoethyl, 3-sulfobutyl, 4-sulfobutyl, 4-carboxyphenyl or 4-sulfophenyl.

Preferred examples of $G_1$ and $G_2$ include cyano and, when $G_1$ and $G_2$ combine to form a cyclic carbon nucleus including the carbon atom to which they are bonded, 1,3-indanedione, 1,3-diethylbarbituric acid, 1,3-diethyl-2-thiobarbituric acid, 3-phenyl-2-isoxazoline-5-one and 3-methyl-1-phenyl-2-pyrazoline-5-one. Of these, cyano is particularly preferred.

The alkyl group represented by $L_1$, $L_2$, $L_3$ or $L_4$ has 1 to 10 carbon atoms and preferably 1 to 5 carbon atoms such as methyl, ethyl and propyl groups.

The aryl groups represented by $L_1$, $L_2$, $L_3$ or $L_4$ has 6 to 15 carbon atoms and preferably 6 to 10 carbon atoms such as phenyl, tolyl and naphthyl groups.

When $L_2$ or $L_3$ forms a carbon ring together with $L_5$ or $L_6$ including carbon atoms to which they are bonded, the carbon ring is a substituted or unsubstituted cyclopentene or a substituted or unsubstituted cyclohexene, wherein the substituent is alkyl or halogen.

When X represents NR, R can include, for example, alkyl having 1 to 20 carbon atoms, such as methyl, ethyl, propyl, isopropyl, butyl, heptyl, dodecyl or octadecyl with methyl, ethyl, propyl and butyl being preferred; aryl having 6 to 20 carbon atoms, such as phenyl, naphthyl or anthryl, or an alkyl- or aryl-substituted aryl group such as tolyl, ethylphenyl or bisphenyl with phenyl and naphthyl being preferred; aralkyl having 7 to 25 carbon atoms such as benzyl or phenethyl; saturated cycloaklyl having 3 to 20 carbon atoms such as cyclopropyl, cyclopentyl, cyclohexyl or 5,5-dimethylcyclohexyl, which may be substituted with alkyl, aryl or aralkyl groups, with cyclopentyl and cyclohexyl being preferred; alkoxy having 1 to 20 carbon atoms wherein the alkyl moiety is as described above, such as methoxy, ethoxy, isopropoxy or butoxy with methoxy, ethoxy and butoxy being preferred; aryloxy wherein the aryl moiety is as described above, such as phenoxy or naphthoxy; acyl having an alkyl-, aryl- or aralkyl-carbonyl group and having 2 to 20 carbon atoms such as acetyl, propionyl, butyryl, benzoyl or phenylacetyl with acetyl, propionyl and butyryl being preferred; aralkenyl containing 1 to 20 carbon atoms having at least one double bond such as allyl, vinyl or 2-butynyl, which may be substituted with alkyl or aryl groups, with allyl and vinyl being preferred; alkynyl containing 1 to 10 carbon atoms having at least one triple bond such as 2-propynyl, 2-butynyl or 3-butynyl, which may be substituted with alkyl or aryl groups, with 2-propionyl and 2-butynyl being preferred; and alkylene containing 1 to 10 carbon atoms such as ethylene, trimethylene or neopentylene with ethylene and trimethylene being preferred.

Preferred examples of X include O and S.

Preferably R represents an alkyl group, an aryl group, an aralkyl group, an acyl group or an alkoxy group which may be substituted or unsubstituted.

In the general formulae represented by A described above, Z represents a group capable of forming an aromatic ring having 6 to 15 carbon atoms and preferably 6 to 10 carbon atoms such as a naphthalene ring or anthracene ring or a condensed or uncondensed 5- to 6-membered heterocyclic ring such as an indole ring, carbazole ring, benzocarbazole ring or dibenzofuran ring which is condensed with the benzene ring to which the hydroxyl group and Y are bonded.

When Z represents an aromatic ring or heterocyclic ring having substituents, examples of substituents include halogen atoms (fluorine, chlorine, bromine and iodine) and lower alkyl groups, preferably those having 1 to 8 carbon atoms (for example, methyl, ethyl, propyl, butyl, isopropyl and isobutyl). The number of substituents is 1 or 2, and when there are two substituents, they may be the same or different.

The alkyl group represented by $R_1$ is preferably an alkyl group having 1 to 12 carbon atoms.

When $R_1$ represents an unsubstituted alkyl group, examples include a methyl group, an ethyl group, a propyl group, a butyl group, a pentyl group, a hexyl group, an isopropyl group, an isobutyl group, an isoamyl group, an isohexyl group, a neopentyl group and a tertbutyl group.

When $R_1$ represents a substituted alkyl group, examples of substituents include a hydroxyl group, alkoxy groups having 1 to 12 carbon atoms, a cyano group, an amino group, alkylamino groups having 1 to 12 carbon atoms, dialkylamino groups which have two alkyl groups each having 1 to 12 carbon atoms, halogen atoms and aryl groups having 6 to 15 carbon atoms. Examples include a hydroxyalkyl group (for example, a hydroxymethyl group, 2-hydroxyethyl group, 3-hydroxypropyl group or 2-hydroxypropyl group), an alkoxyalkyl group (for example, a methoxymethyl group, 2-methoxyethyl group, 3-methoxypropyl group, ethoxymethyl group or 2-ethoxyethyl group), a cyanoalkyl group (for example, a cyanomethyl group or 2-cyanoethyl group), an aminoalkyl group (for example, an aminomethyl group, 2-aminomethyl group or 3-aminopropyl group), an (alkylamino)alkyl group (for example, a (methylamino)methyl group, 2-(methylamino)ethyl group or (ethylamino)methyl group), a (dialkylamino)alkyl group (for example, a (dimethylamino)methyl group or 2-(dimethylamino)ethyl group), a halogenoalkyl group (for example, a fluoromethyl group, chloromethyl group or bromomethyl group), or an aralkyl group (for example, a benzyl group or phenethyl group).

When $R_1$ represents a substituted phenyl group, examples of substituents include a hydroxyl group, alkoxy groups having 1 to 12 carbon atoms, a cyano group, an amino group, alkylamino groups having 1 to 12 carbon atoms, dialkylamino groups which have two alkyl groups each having 1 to 12 carbon atoms, halogen atoms, alkyl groups having 1 to 6 carbon atoms and a nitro group. Examples include a hydroxyphenyl group, an alkoxyphenyl group (for example, a methoxyphenyl group or ethoxyphenyl group), a cyanophenyl group, an aminophenyl group, an (alkylamino)phenyl group (for example, a (methylamino)phenyl group or (ethylamino)phenyl group), a (dialkylamino)phenyl group (for example, a (dimethylamino)phenyl group), a halogenophenyl group (for example, a fluorophenyl group, a chlorophenyl group or bromophenyl group), an alkylphenyl group (for example, a tolyl group, ethylphenyl group, cumenyl group, xylyl group or mesityl group), a nitrophenyl group, or a group having two or three of the above-described substituents, which may be the same or different, and which may occupy any position or positions on the phenyl ring.

Preferred examples of $R_1$ include methoxy phenyl, dimethylaminophenyl, chlorophenyl and tolyl groups.

When $R_2$ represents a substituted amino group, the group has 1 to 20 carbon atoms, including, e.g., a methylamino group, an ethylamino group, a propylamino group, a phenylamino group, a tolylamino group, a benzylamino group, a phenethylamino group, a dimethylamino group, a diethylamino group and a diphenylamino group.

When $R_2$ represents a lower alkyl group, the group has 1 to 6 carbon atoms, including, e.g., a methyl group, an ethyl group, a propyl group, a butyl group, an isopropyl group and an isobutyl group.

When $R_2$ represents an alkoxycarbonyl group, the alkoxy moiety has 1 to 12 carbon atoms, an includes, e.g., a methoxycarbonyl group, an ethoxycarbonyl group, a propoxycarbonyl group, a butoxycarbonyl group, an isopropoxycarbonyl group and a benzyloxycarbonyl group.

When $R_2$ represents an aryloxycarbonyl group, the aryloxy moiety has 6 to 20 carbon atoms, and includes, e.g., a phenoxycarbonyl group and a toluoxycarbonyl group.

Preferred examples of $R_2$ include methylamino, ethylamino, dimethylamino, diethylamino, methyl, ethyl, propyl, butyl, methoxycarbonyl, ethoxycarbonyl and phenoxycarbonyl groups.

It is preferred that $R_3$ and $R_5$ each represents a hydrogen atom, an alkyl group having 1 to 20 carbon atoms, a condensed or uncondensed 6-membered aromatic group having 6 to 18 carbon atoms such as a phenyl group or a naphthyl group, a condensed or uncondensed 5- or 6-membered heteroaromatic group containing an oxygen atom, a nitrogen atom or a sulfur atom, such as a dibenzofuranyl group, carbazolyl group or a benzocarbazolyl group, or a substituted alkyl, aromatic or heteroaromatic group.

When $R_3$ or $R_5$ represents a substituted or unsubstituted alkyl group, examples include the same substituted or unsubstituted alkyl groups as described for $R_1$.

When $R_3$ or $R_5$ represents a substituted aromatic group such as a substituted phenyl group or a substituted naphthyl group, or a substituted heteroaromatic group containing hetero atoms, such as a substituted dibenzofuranyl group or a substituted carbazolyl group, examples of substituents include a hydroxyl group, a cyano group, a nitro group, halogen atoms (for example, fluorine, chlorine, bromine and iodine), alkyl groups having 1 to 12 carbon atoms (for example, a methyl group, an ethyl group, a propyl group and an isopropyl group), alkoxy groups having 1 to 12 carbon atoms (for example, a methoxy group, an ethoxy group, a propoxy group, a butoxy group, a pentyloxy group, an isopropoxy group, an isobutoxy group, an isoamyloxy group, a tert-butoxy group and a neopentyloxy group), an amino group, alkylamino groups having 1 to 12 carbon atoms (for example, a methylamino group, an ethylamino group and a propylamino group), dialkylamino groups having 2 alkyl groups each having 1 to 12 carbon atoms (for example, a dimethylamino group, a diethylamino group and an N-methyl-N-ethylamino group), arylamino groups having 6 to 12 carbon atoms (for example, a phenylamino group and a tolylamino group), diarylamino groups having 2 aryl groups each (1) 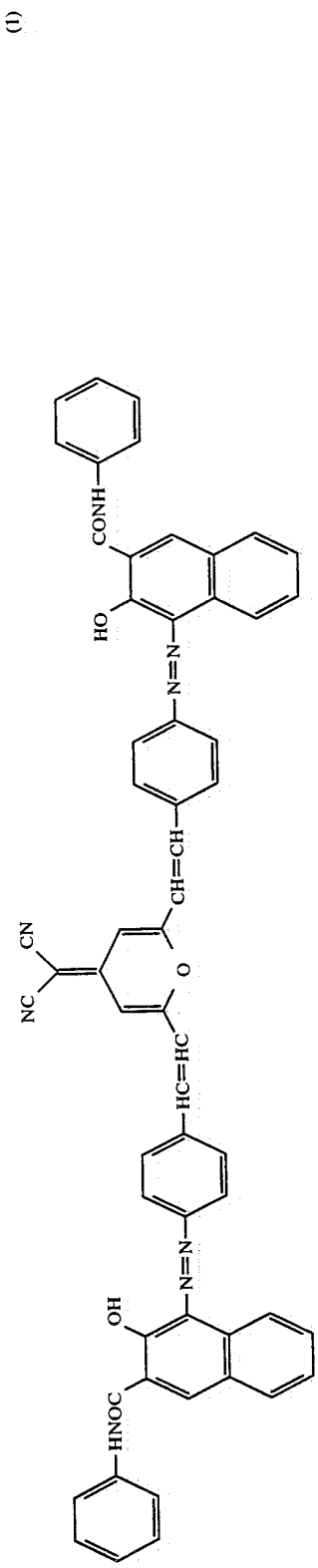
(2) 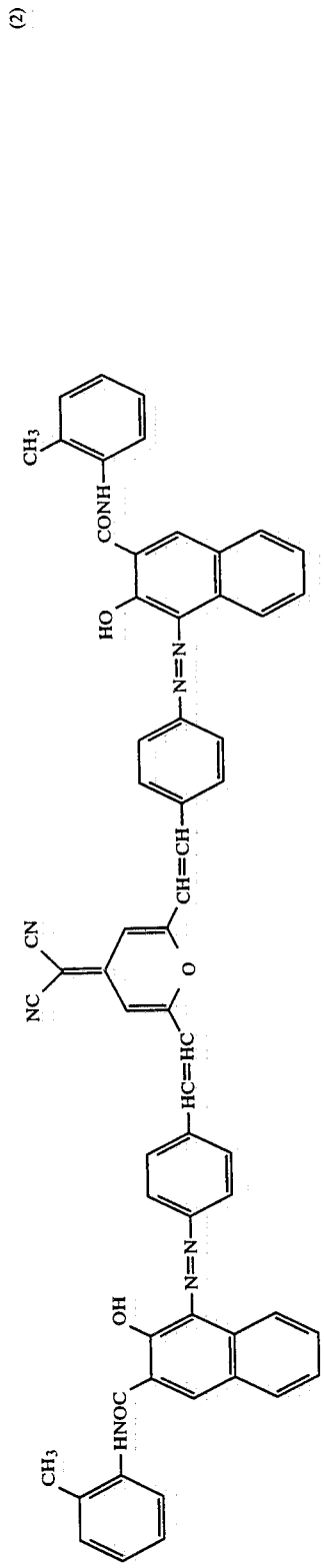
(3) 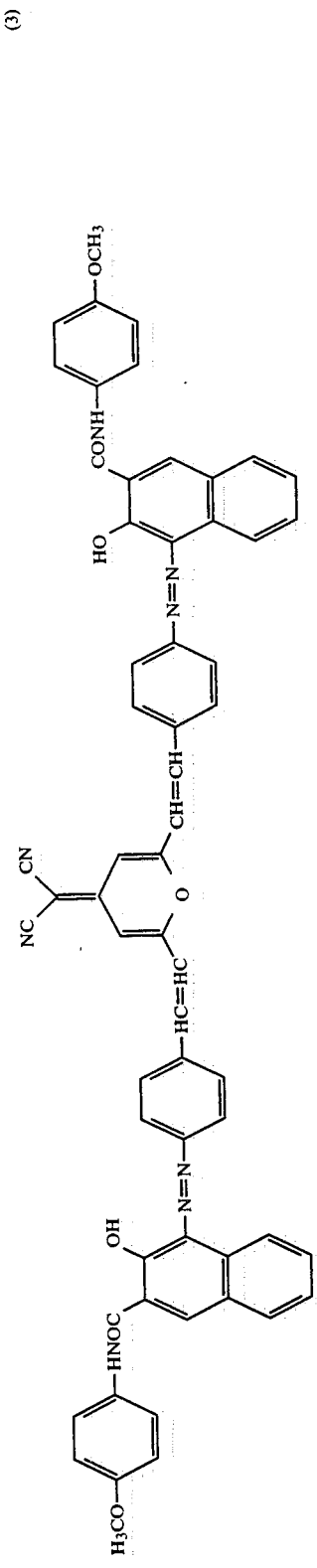

having 6 to 15 carbon atoms (for example, a diphenylamino group), a carboxyl group, an alkali metal carboxylate group (wherein the alkali metal cation includes, e.g., Na+, K+ and Li+), an alkali metal sulfonate group (wherein the alkali metal cation includes, e.g., Na+, K+ and Li+), alkylcarbonyl groups having 2 to 20 carbon atoms (for example, an acetyl group, a propionyl group and a benzylcarbonyl group), arylcarbonyl groups having an aryl moiety having 6 to 12 carbon atoms (for example, a benzoyl group and a toluoyl group), alkylthio groups having 1 to 12 carbon atoms (for example, a methylthio group and an ethylthio group) and arylthio groups having 1 to 12 carbon atoms (for example, a phenylthio group and a tolylthio group). The number of substituents is 1 to 3, and when a plurality of substituents are present, they may be the same or different, and may be bonded at any position of the aromatic group.

Preferred Examples of $R_3$ and $R_5$ include hydroxyphenyl, hydroxynaphthyl, chlorophenyl, chloronaphthyl, bromophenyl, bromodibenzofuran, bromocarbazole, carboxymethylphenyl, carboxymethyldibenzofuran and carboxymethylcarbazole groups.

When $R_4$ represents a substituted or unsubstituted alkyl group having 1 to 20 carbon atoms or a phenyl group, examples of $R_4$ include the substituted or unsubstituted alkyl group and phenyl group described for $R_3$ and $R_5$.

A moiety A derived from couplers,

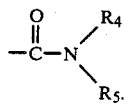

is preferred, because it produces a photoconductive composition or electrophotographic light-sensitive layer being high light sensitivity, and disazo compounds containing this A moiety can be produced at a moderate price, due to the availability of raw materials.

Preferred examples of $R_4$ include phenyl, naphthyl, dibenzofuran, carbazole, bromphenyl, bromodibenzofuran and bromocarbazole groups.

It is preferred that Z represent a naphthalene ring, a carbazole ring, a benzocarbazole ring or a dibenzofuran ring, which is formed by condensation with the benzene ring to which the hydroxyl group and Y bond, and that Y represent $$-\overset{\overset{\displaystyle O}{\|}}{C}-N\diagup^{R_4}_{R_5.}$$

In the following, particular examples of compounds of the present invention are described, among which Compounds 1 and 3 to 10 are preferred, although the present invention is not to be construed as being limited thereto.

-continued
(4)
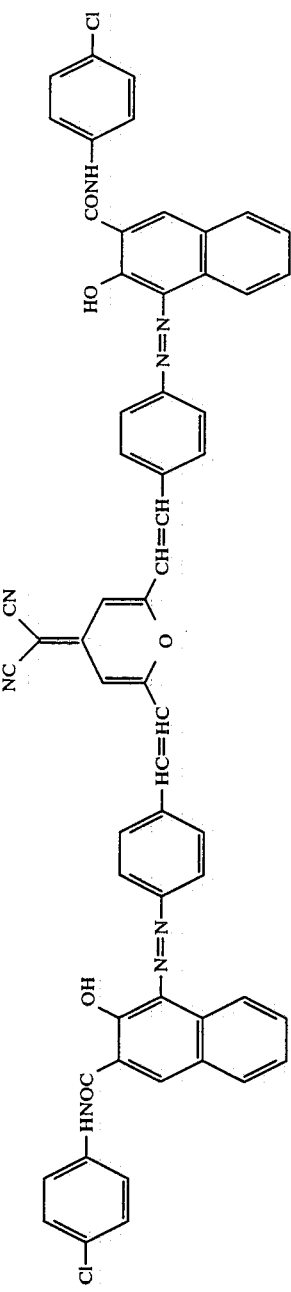
(5)
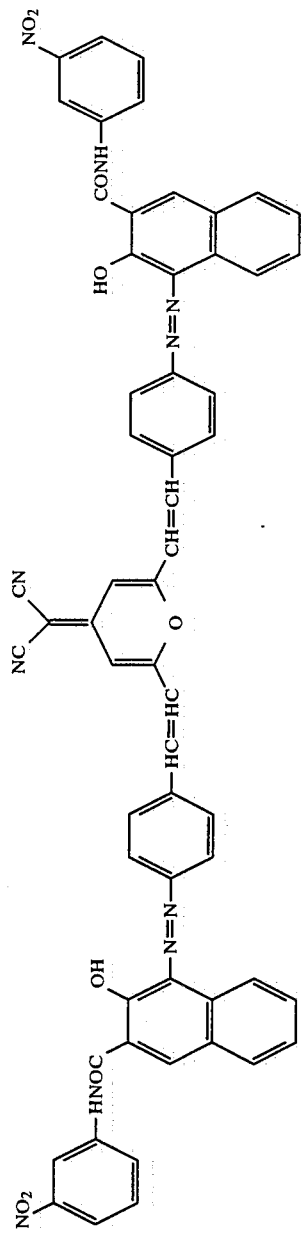
(6)
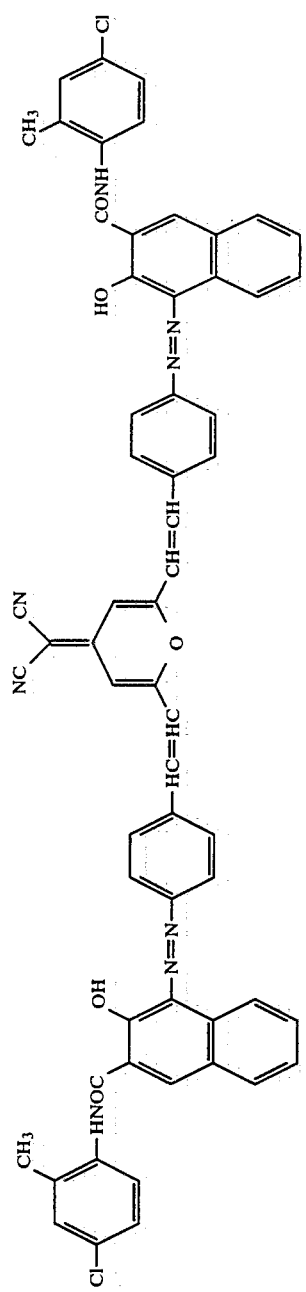

(7)
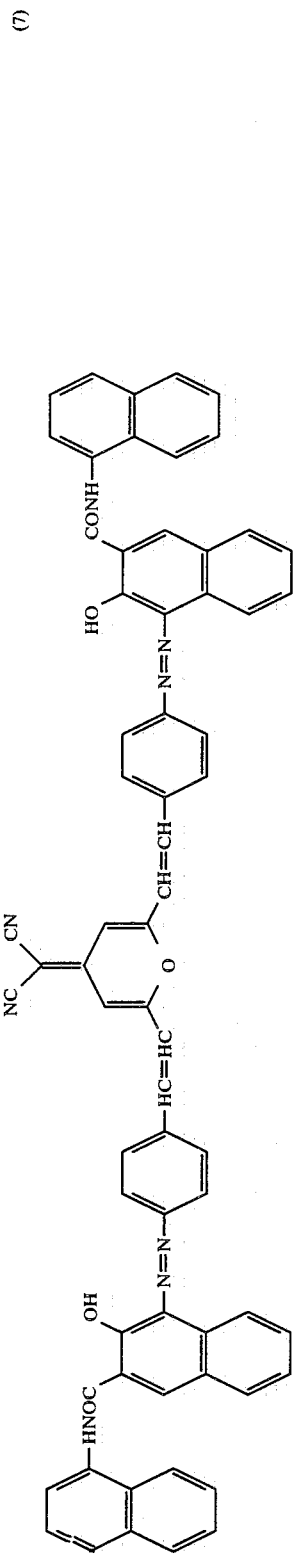
(8)
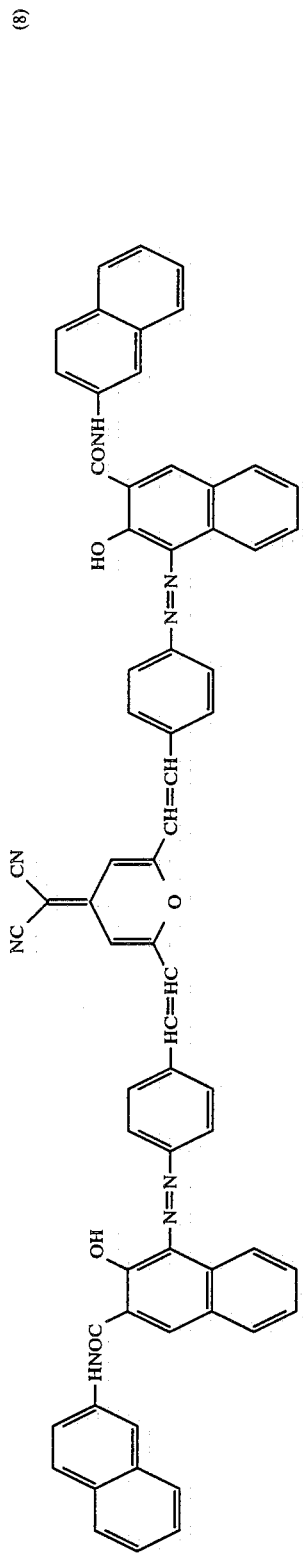
(9)
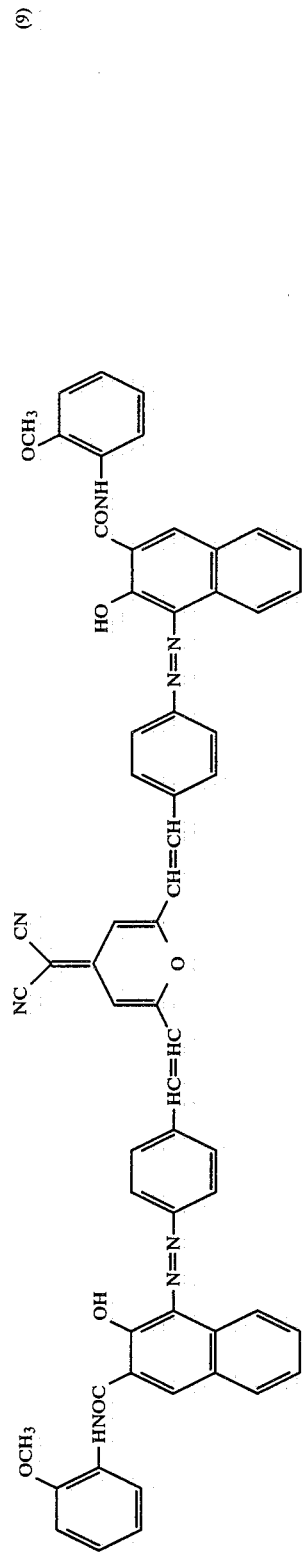

(10)
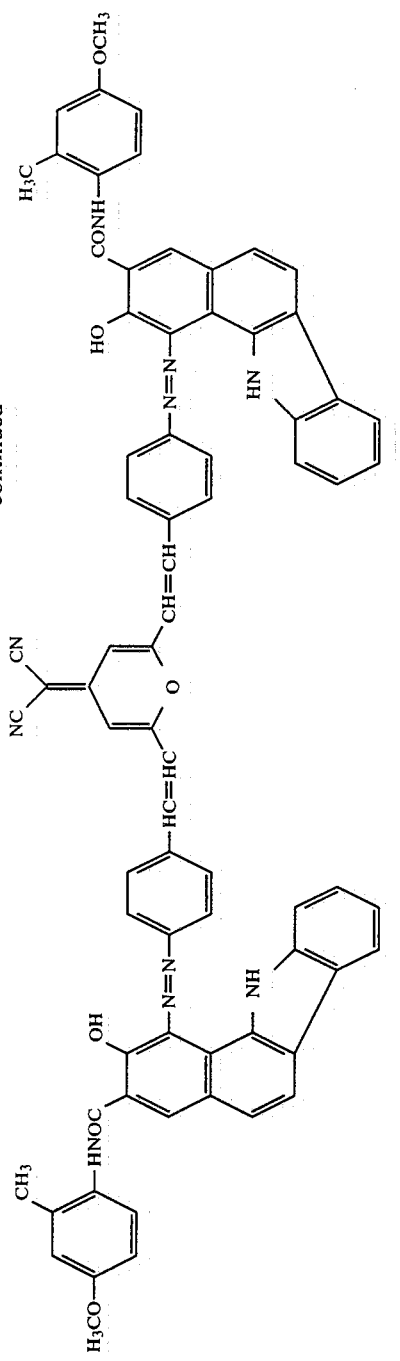
(11)
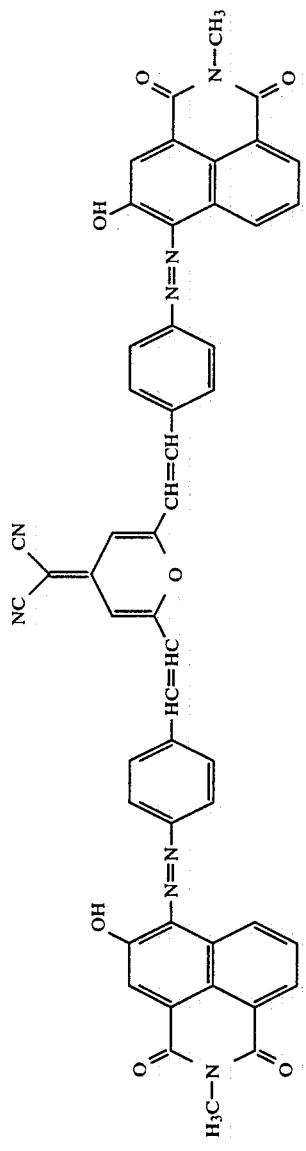
(12)
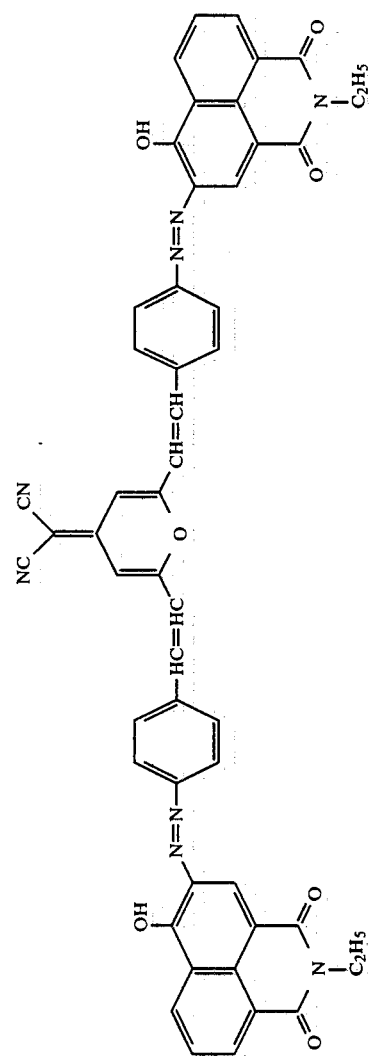

-continued
(13)
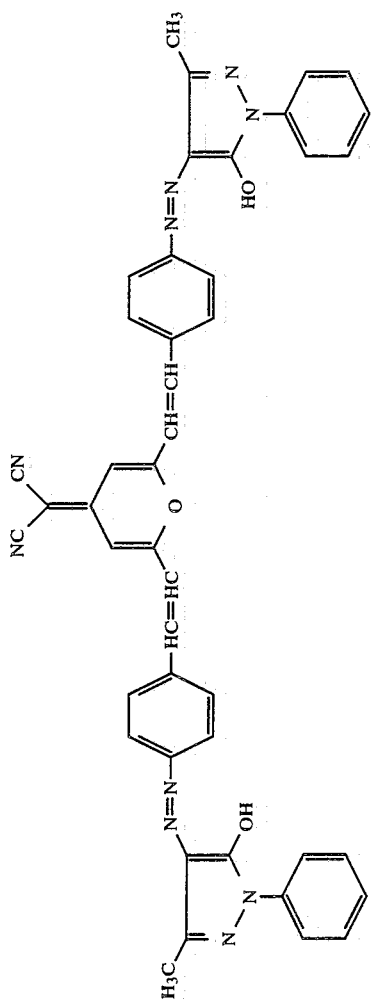
(14)
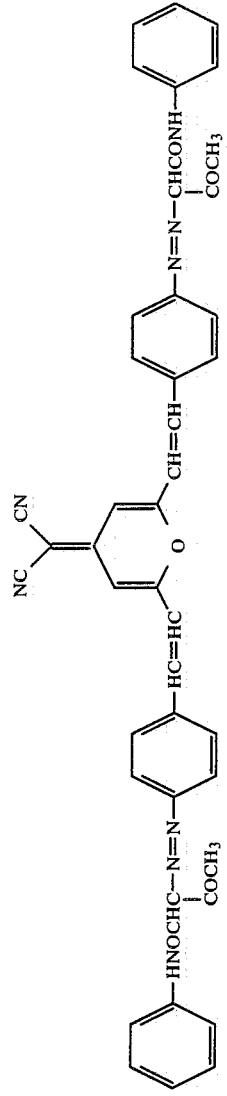
(15)
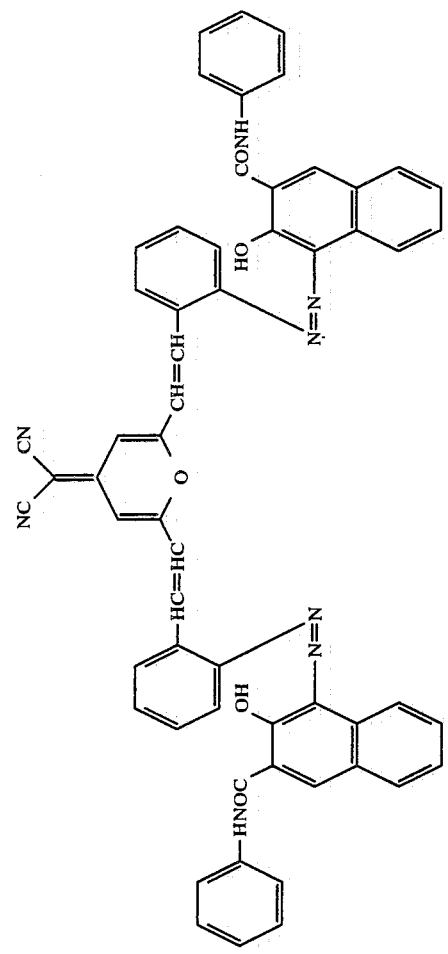

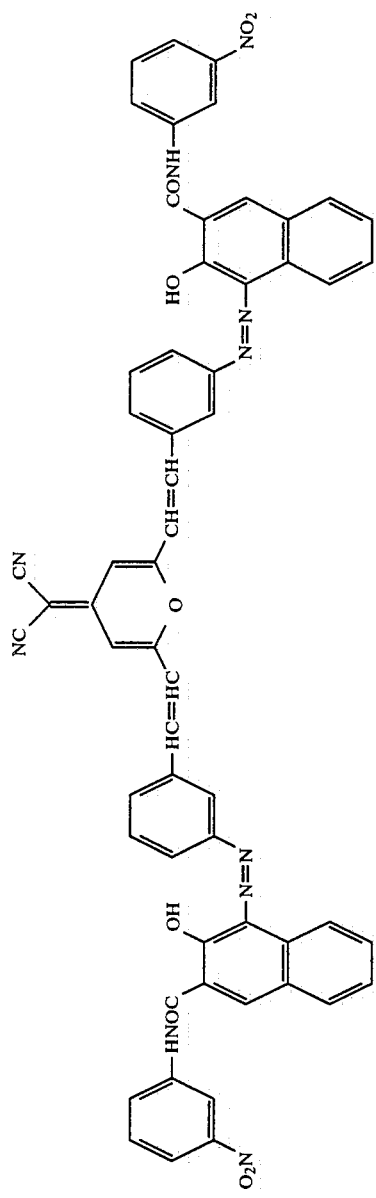
(16)
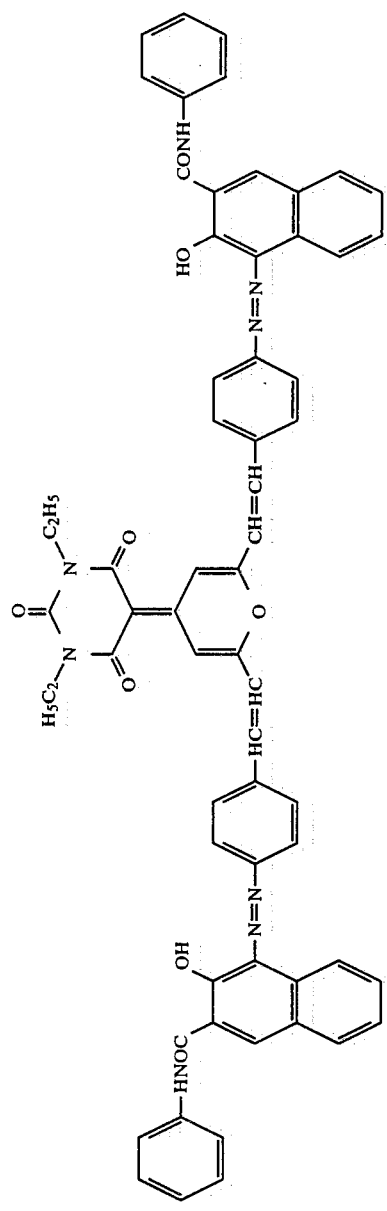
(17)

-continued
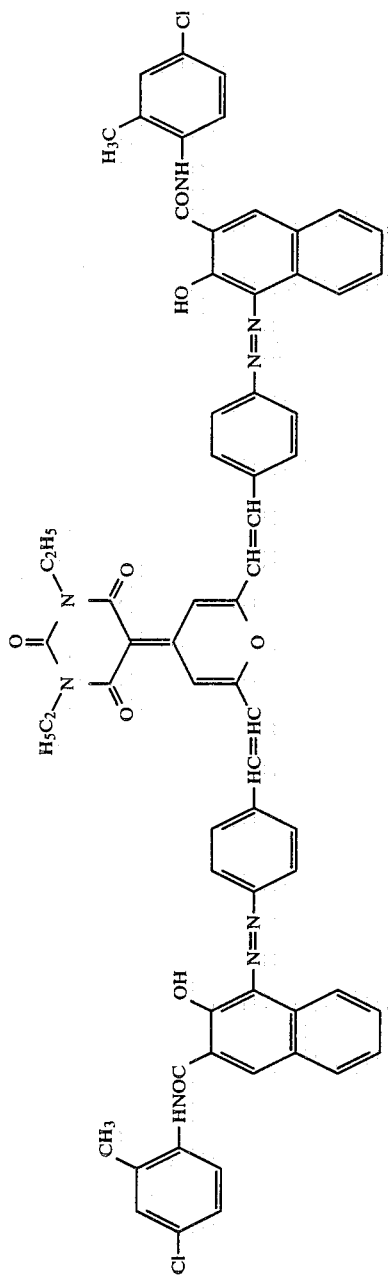
(18)
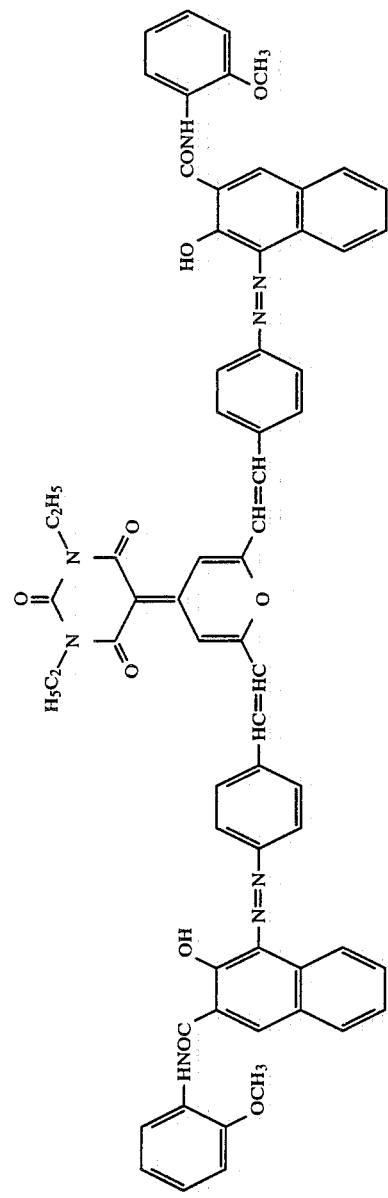
(19)

-continued
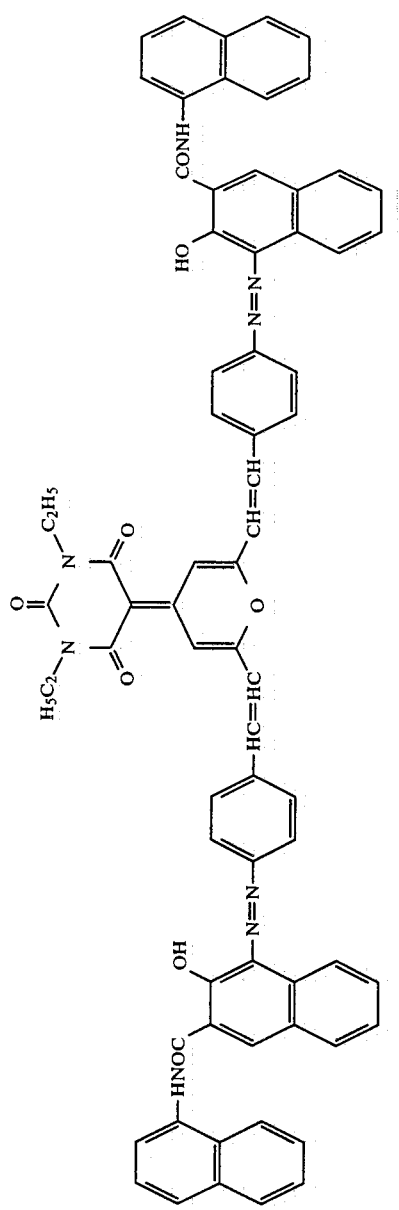
(20)
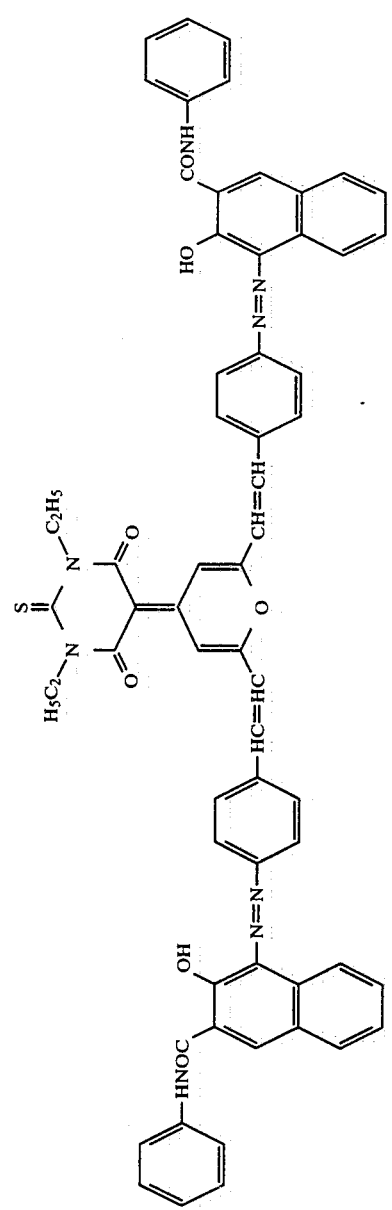
(21)

-continued
(22)
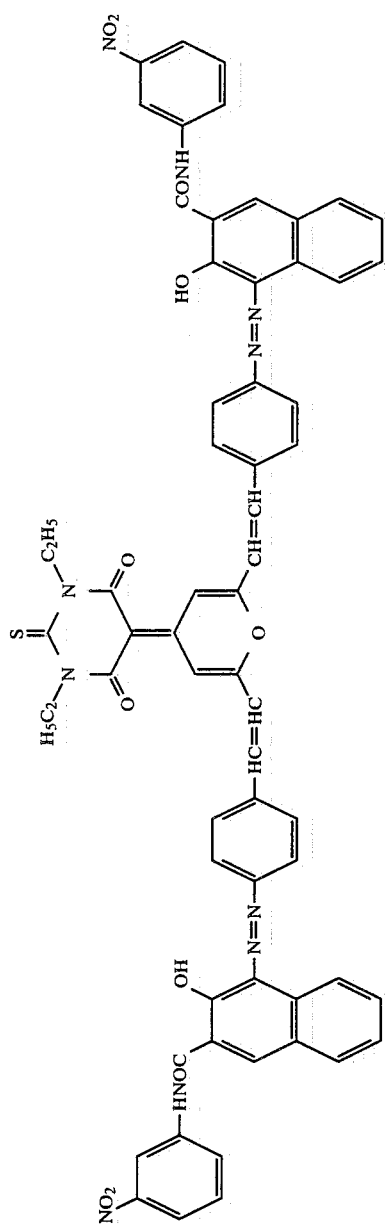
(23)
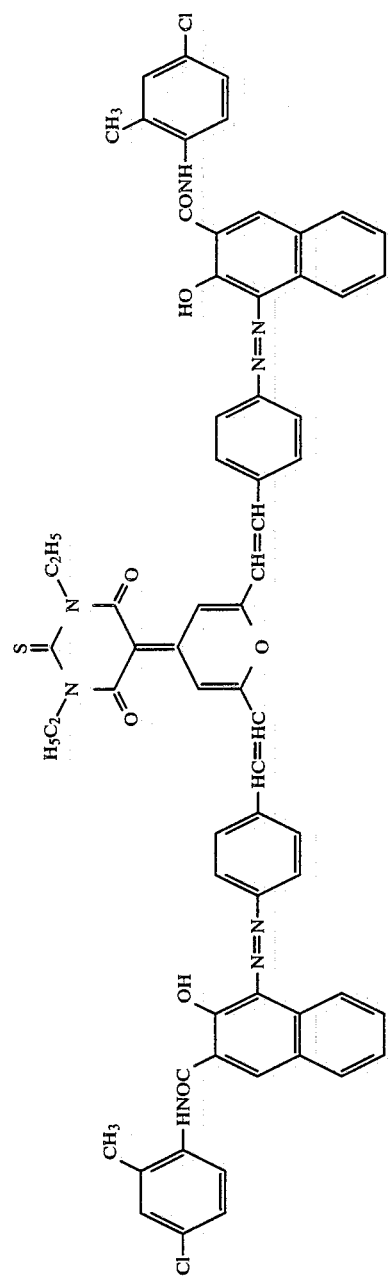

(24)
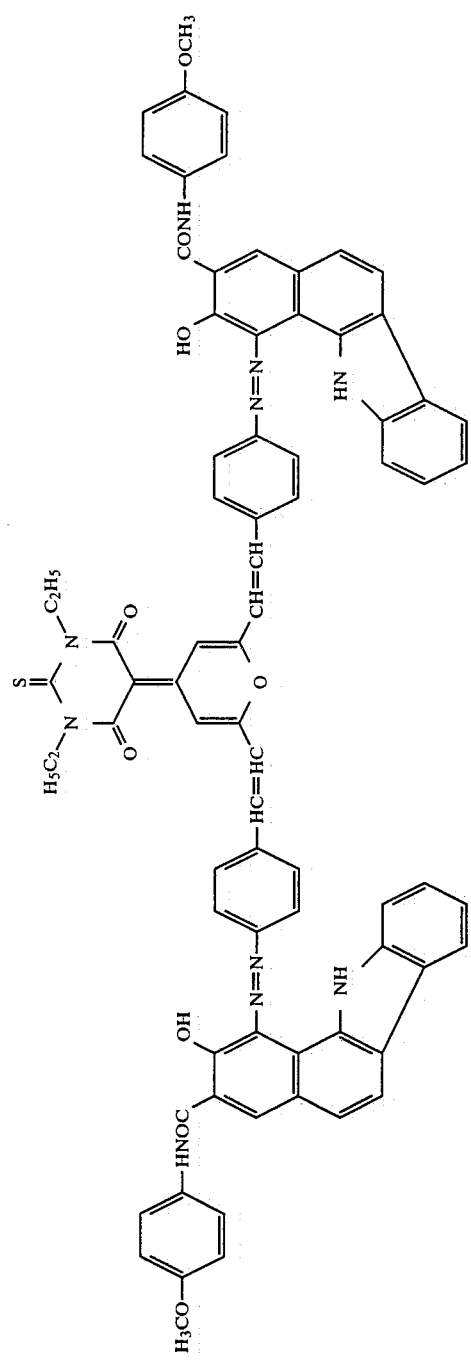
(25)
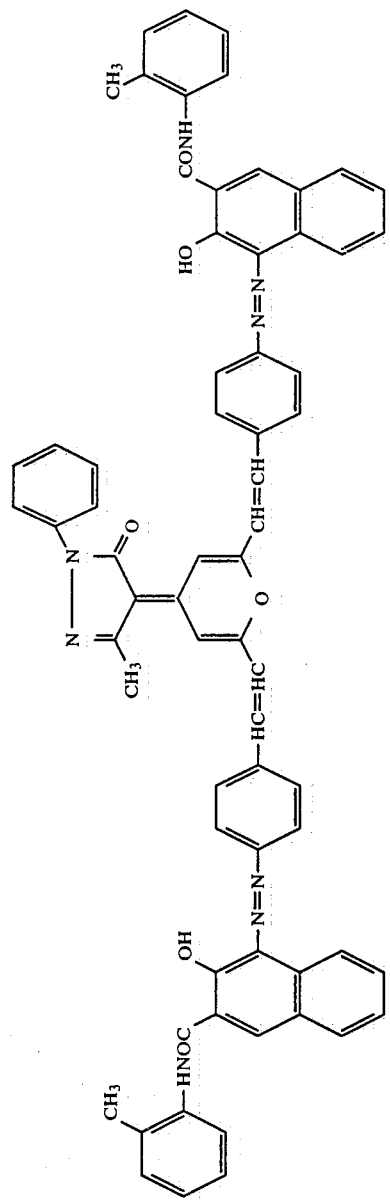

(26)
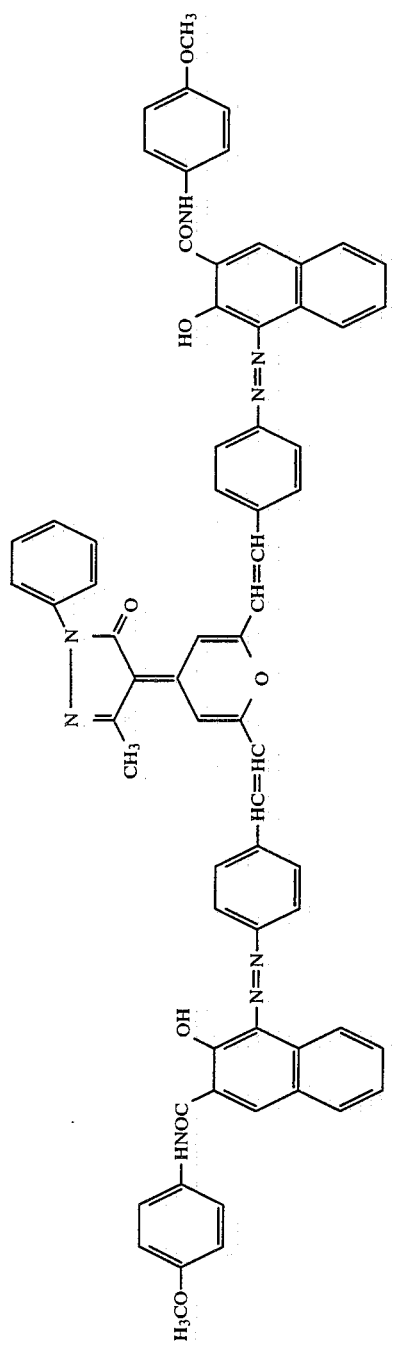
(27)
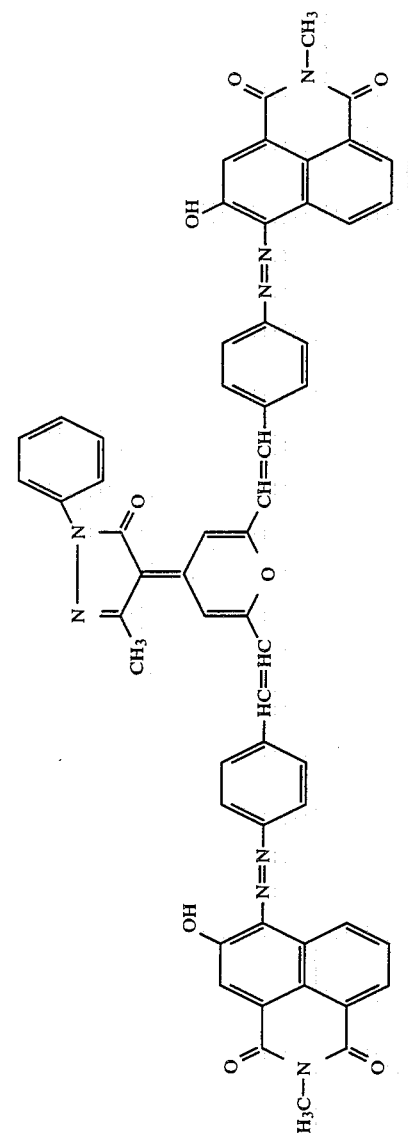

-continued
(28)
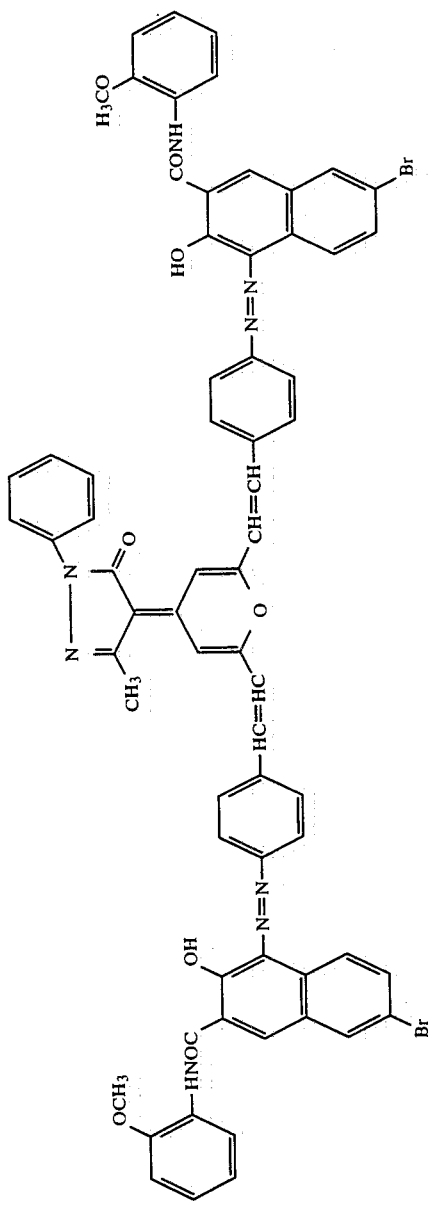
(29)
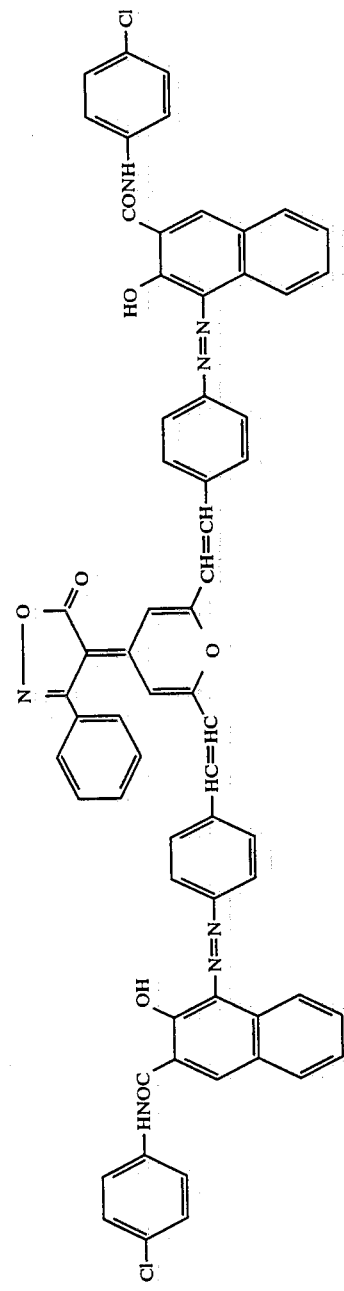

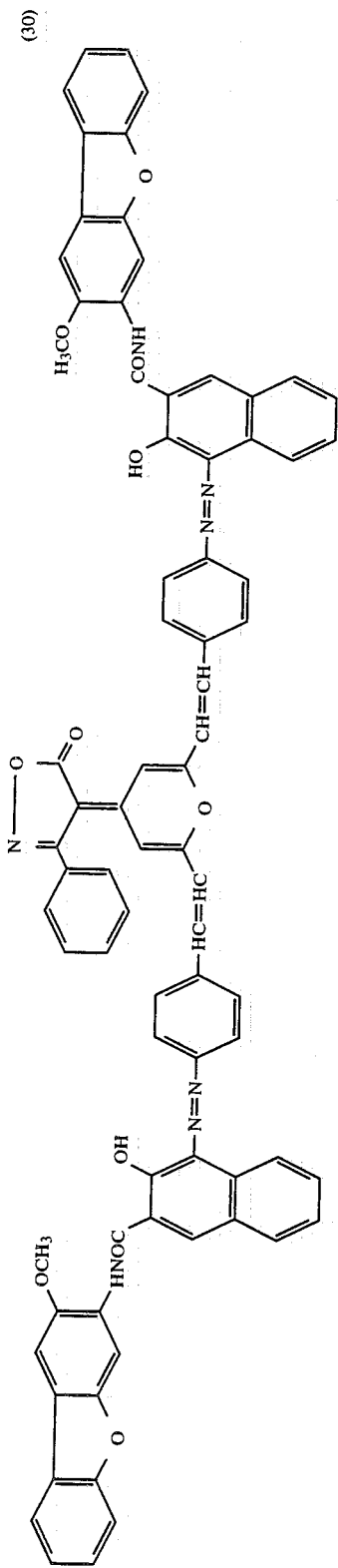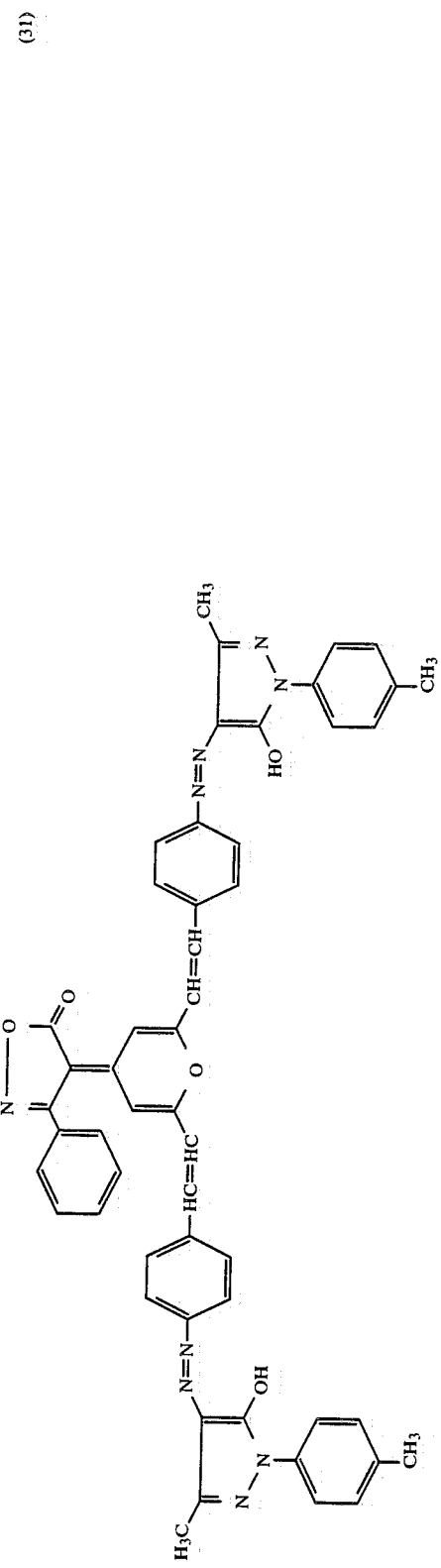

-continued
(32)
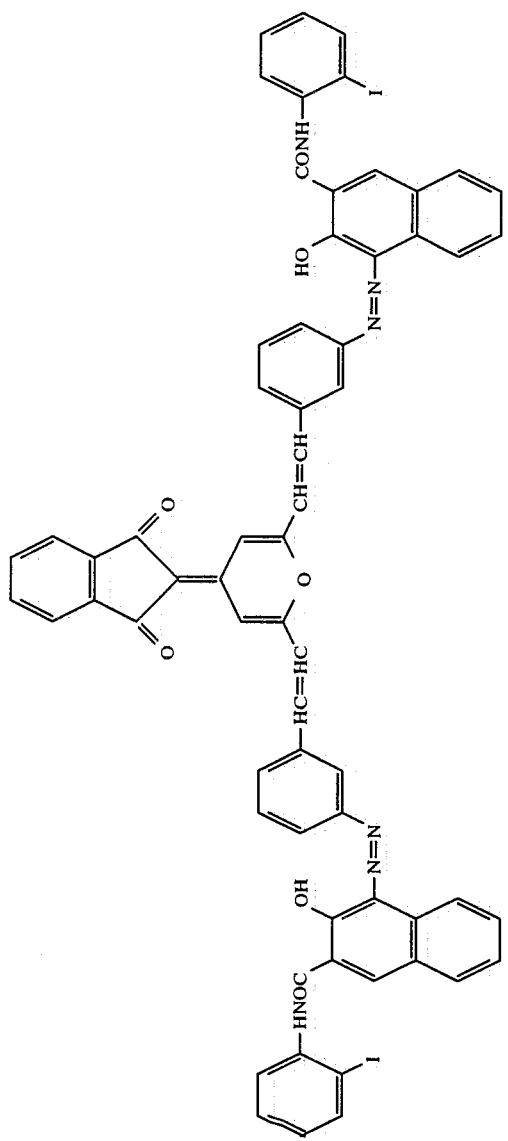
(33)
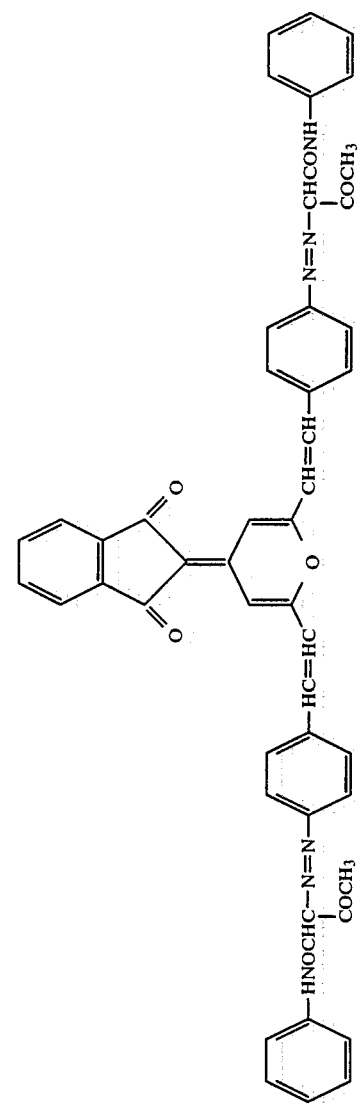

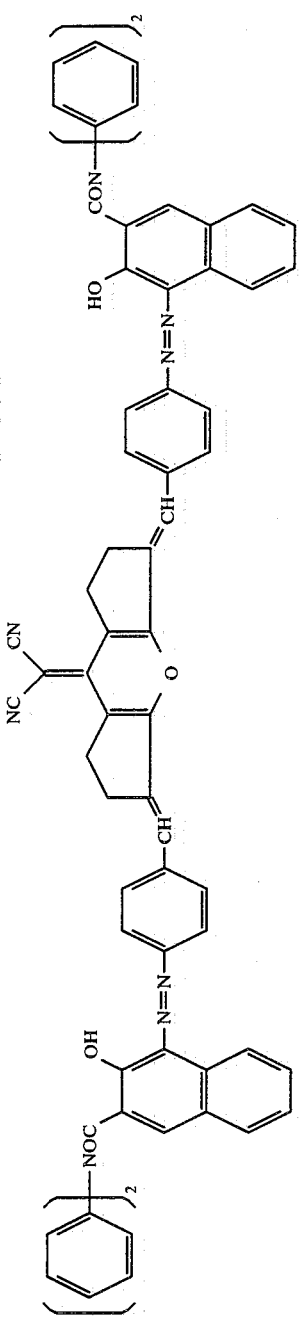 (34)
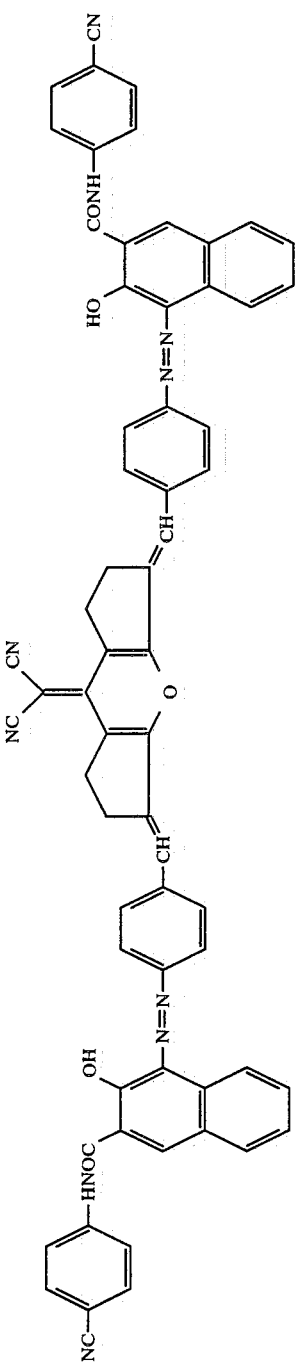 (35)
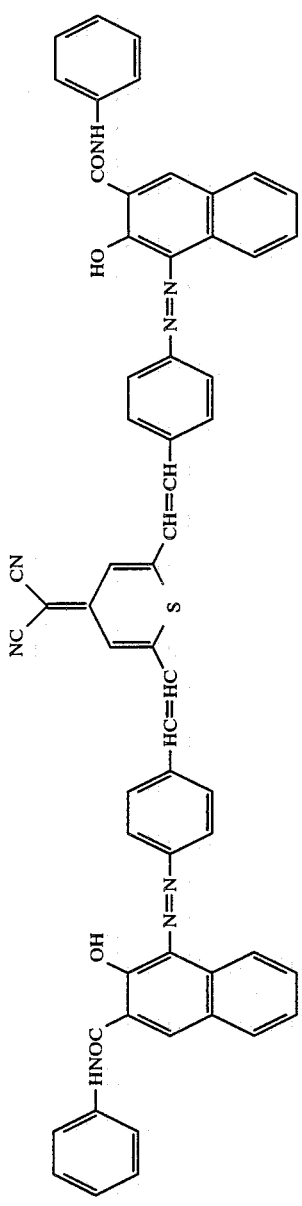 (36)

-continued
(37)
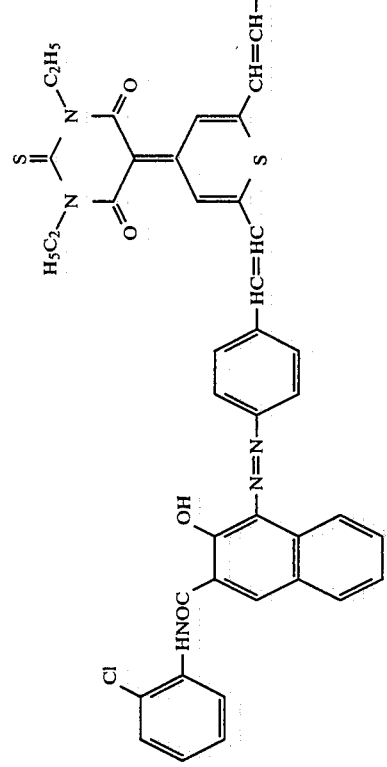
(38)
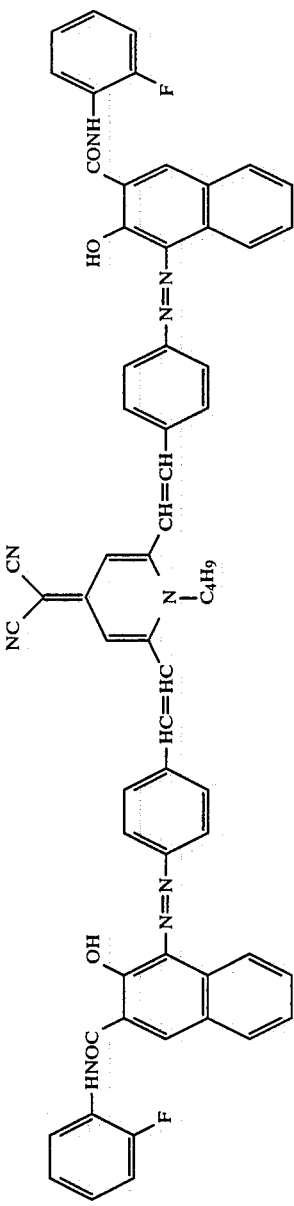
(39)
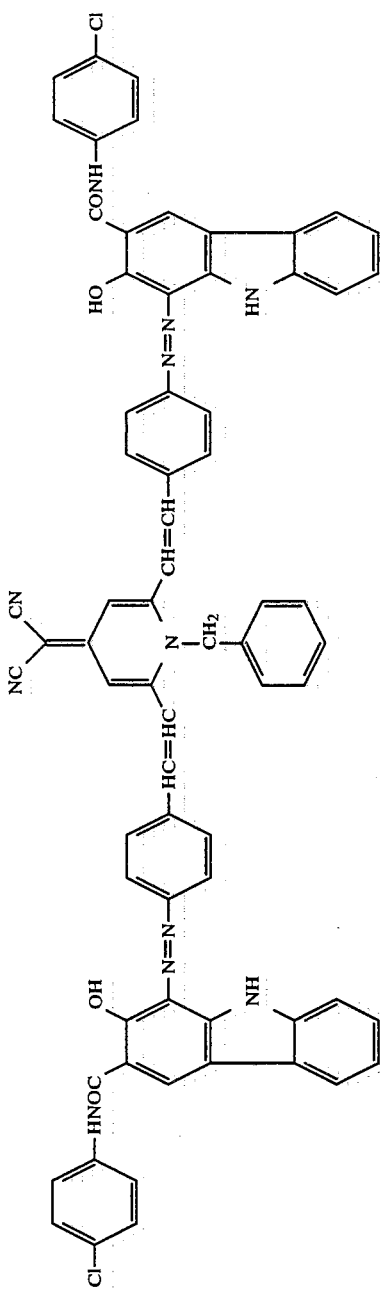

The disazo compounds used in the present invention can be prepared in a manner analogous to processes as described in, for example, U.S. Pat. Nos. 4,251,614 and 4,268,596.

Synthesis Examples 1 to 4 of disazo compounds according to the present invention are as follows.

SYNTHESIS EXAMPLE 1

Synthesis of 4-dicyanomethylene-2,6-dimethyl-4H-pyran 17.96 g (0.145 mole) of 2,6-dimethyl-4-pyrone and 10.50 g (0.159 mole) of malonitrile were refluxed in 70 ml of acetic acid anhydride for 1 hour with heating.

After conclusion of the reaction, the reacting solution was cooled. The crystals formed were collected by filtration, washed with ethanol and dried to obtain 13.37 g of crystals having a melting point of 188° C. Yield: 54%.

SYNTHESIS EXAMPLE 2

Synthesis of 4-dicyanomethylene-2,6-bis(4-nitrostyryl)-4H-pyran

A mixture of 35.1 g (0.204 mole) of 4-dicyanomethylene-2,6-dimethyl-4H-pyran, 62.0 g (0.410 mole) of p-nitrobenzaldehyde and 51.5 g of triethylamine was stirred in 200 ml of pyridine for 2 hours while heating to 120° C.

After conclusion of the reaction, 50 ml of DMSO was added, the reaction mixture was cooled, and the resulting black solid was collected by filtration. After washing with ethanol, it was dried. Then, the solid was stirred in 200 ml of DMSO for 30 minutes while heating to 120° C. After cooling, it was filtered to collect the resulted yellow solid, which was washed with ethanol and then with acetone, followed by drying.

Yield: 8.14 g (9%). Melting Point: above 300° C.

IR absorption spectrum (KBr tablet): 2220, 1645, 1618, 1512 and 1348 cm$^{-1}$

SYNTHESIS EXAMPLE 3

Synthesis of 4-dicyanomethylene-2,6-bis(4-aminostyryl)-4H-pyran

To a mixture of 8.14 g (0.0186 mole) of 4-dicyanomethylene-2,6-bis(4-aminostyryl)-4H-pyran, 20 g of iron powder, 20 g of water and 500 ml of DMF, 10 ml of concentrated hydrochloric acid was added with stirring.

After the stirring was continued for 1 hour on an oil bath at 100° C., the reaction mixture was filtered to remove solid materials.

The filtrate was poured into 2 l of water, and it was alkalized with 100 ml of an aqueous solution containing 10 g of sodium hydroxide. The solid formed was collected by filtration and dried.

The resulting solid was dissolved in 300 ml of DMF while heating at 120° C., and the solution was poured into 1 liter of water. The solid formed was collected by filtration and dried to obtain 5.73 g of reddish solid.

Yield: 81%. Melting Point: 249° C.

IR absorption spectrum (KBr tablet): 3440, 3320, 2200, 1632, 1590, 1170 cm$^{-1}$

SYNTHESIS EXAMPLE 4

Synthesis of disazo compound (2)

500 mg (1.32 mmoles) of 4-dicyanomethylene-2,6-bis(4-aminostyryl)-4H-pyran was dispersed in 25 ml of a 2.4N hydrochloric acid solution by stirring.

While maintaining the dispersion at −12° C. to −10° C. with ice and common salt, 3 ml of an aqueous solution containing 150 mg of sodium nitrite was added dropwise over 10 minutes with vigorous stirring.

After the stirring was continued at the same temperature for 1 hour, insoluble materials were removed by filtration, and 42% fluoroboric acid was added to the filtrate to precipitate a solid. The resulting solid was collected by filtration, washed with water and dried.

Yield: 530 mg (70%).

250 mg (0.436 mmole) of the resulting tetrazonium salt and 253 mg (0.914 mmole) of N-(2-methylphenyl)-2-hydroxy-3-naphthoic acid amide were dissolved in 20 ml of DMF. While stirring the resulted solution cooled with ice, 0.3 ml of a solution prepared by dissolving 200 mg of sodium acetate in water was added dropwise.

The reaction mixture was stirred for 3 hours while the temperature was gradually raised to room temperature.

10 ml of water was then added, and the precipitate formed was collected by filtration and washed in the following solutions in this order:
1. Mixed solvent of DMF-water (2:1 vol/vol): 100 ml
2. Mixed solvent of DMF-water (1:1 vol/vol): 100 ml
3. Water: 100 ml
4. Acetone: 100 ml After washing, it was dried to obtain 305 mg of crystals of Compound (2) having a metallic luster (melting point: above 300° C.).

Yield: 70%.

Elementary Analysis: $C_{60}H_{42}N_8O_5$, Calculation C: 75.45%, H: 4.43%, N: 11.73%. Found: C: 75.18%, H: 4.65%, N: 11.79%.

IR absorption spectrum (KBr tablet): 2210, 1638, 1535 and 1480 cm$^{-1}$

Visible ray absorption spectrum (DMF solution containing 5% of ethylenediamine)

Absorption maximum wavelength: 567 nm.

SYNTHESIS EXAMPLES 5 TO 14

Disazo Compounds (1), (6), (9), (7), (8), (4), (5), (3) and (10) were synthesized by the same process as in the above described Synthesis Examples 1 to 4, respectively.

The decomposition temperature, elementary analysis, IR absorption spectrum and visible ray absorption spectrum of each disazo compound are shown in Table 1. The IR absorption spectra and the visible light absorption spectra were measured in the same manner as in Synthesis Example 4.

TABLE 1

| Synthesis Example | Coupler | Disazo Compound (decomposition temperature) | Elementary Analysis Calcd. (%) | Found (%) | IR Absorption Spectrum cm$^{-1}$ (KBr process) | Visible Ray Absorption Spectrum (nm) |
|---|---|---|---|---|---|---|
| 5 | HO–naphthalene–CONH–phenyl | 1 (290° C.) | C 75.14<br>H 4.13<br>N 12.08 | 75.28<br>4.03<br>12.11 | 2220<br>1640<br>1540<br>1485 | 517 |
| 6 | HO–naphthalene–CONH–(2-CH$_3$,4-Cl-phenyl) | 6 (280° C.) | C 70.38<br>H 3.93<br>N 10.94 | 70.40<br>3.85<br>10.98 | 2200<br>1635<br>1532<br>1477 | 562 |
| 7 | HO–naphthalene–CONH–(2-OCH$_3$-phenyl) | 9 (above 300° C.) | C 73.01<br>H 4.28<br>N 11.35 | 73.25<br>4.30<br>11.15 | 2210<br>1639<br>1533<br>1490 | 570 |
| 8 | HO–naphthalene–CONH–(1-naphthyl) | 7 (268–269° C.) | C 77.17<br>H 4.12<br>N 10.90 | 77.23<br>4.08<br>11.13 | 2220<br>1642<br>1543<br>1480 | 560 |
| 9 | HO–naphthalene–CONH–(2-naphthyl) | 8 (273–274° C.) | C 77.17<br>H 4.12<br>N 10.90 | 77.35<br>4.08<br>11.09 | 2200<br>1635<br>1540<br>1475 | 560 |

TABLE 1-continued

| Synthesis Example | Coupler | Disazo Compound (decomposition temperature) | Elementary Analysis Calcd. (%) | Found (%) | IR Absorption Spectrum cm$^{-1}$ (KBr process) | Visible Ray Absorption Spectrum (nm) |
|---|---|---|---|---|---|---|
| 10 | 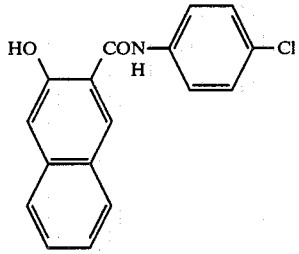 | 4 (274–275° C.) | C 69.95<br>H 3.64<br>N 11.25 | 69.73<br>3.55<br>11.36 | 2200<br>1640<br>1530<br>1480 | 560 |
| 11 | 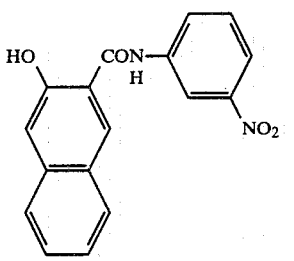 | 5 (288° C.) | C 68.49<br>H 3.56<br>N 13.77 | 68.42<br>3.66<br>13.95 | 2220<br>1640<br>1530<br>1485 | 540 |
| 12 | 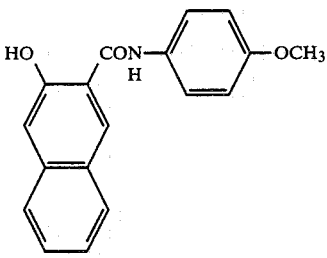 | 3 (270° C.) | C 73.01<br>H 4.28<br>N 11.35 | 73.12<br>4.01<br>11.50 | 2190<br>1630<br>1530<br>1470 | 559 |
| 13 | 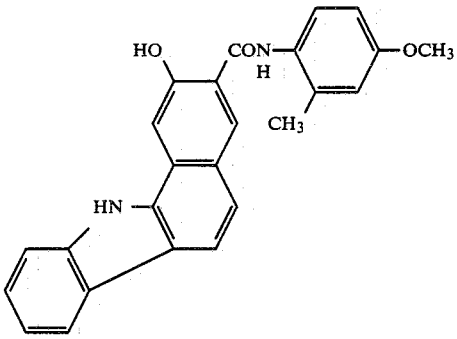 | 10 (295° C.) | C 74.48<br>H 4.39<br>N 11.73 | 74.56<br>4.21<br>11.59 | 2200<br>1640<br>1540<br>1380 | 585 |

The infrared absorption spectrum (KBr process) of Disazo Compound (1) is shown in FIG. 1.

The electrophotographic light-sensitive materials of the present invention have an electrophotographic light-sensitive layer containing one or more disazo compounds represented by the above-described general formula. Electrophotographic light-sensitive materials having various structures are known. The electrophotographic light-sensitive materials of the present invention are not unduly limited, and may be any type of light-sensitive material, but they generally have the following structure.

(1) A structure having an electrophotographic light-sensitive layer containing the disazo compound according to the invention dispersed in a binder or an electric charge carrier transferring medium, provided on an electrically conductive base.

(2) A structure having an electric charge carrier generating layer containing the disazo compound according to the invention as a main component, provided on an electrically conductive base and having an electric charge carrier transferring medium layer provided on the electric charge carrier generating layer.

The disazo compound of the present invention acts as a photoconductive substance, and it generates an electric charge carrier very efficiently when it absorbs light. The generated electric charge carrier can be transferred using the disazo compound as a medium, but it is more effective to transfer it using an electric charge carrier transfer compound as a medium.

In order to produce the electrophotographic light-sensitive material of type (1), fine particles of the disazo compound are dispersed in a solution of a binder or a solution prepared by dissolving an electric charge carrier transfer compound and a binder, and the resulting dispersion is applied to an electrically conductive base and dried. In this case, the electrophotographic light-sensitive layer is preferred to have a thickness of about 3 to 30μ and preferably about 5 to 20μ.

In order to produce the electrophotographic light-sensitive material of type (2), the disazo compound is applied to an electrically conductive base by vacuum evaporation or by applying it dissolved in a solution of a solvent such as amine, or as a dispersion of fine particles of the disazo compound in a suitable solvent or, if desired, in a solvent in which a binder is also dissolved, and drying, and thereafter applying a solution containing an electric charge carrier transfer compound and a binder to the resulting layer and drying. In this case, the disazo compound layer which is an electric charge carrier generating layer is preferred to have a thickness of about 0.01 to 4μ and preferably 0.01 to 2μ, and the electric charge carrier transfer medium layer is preferred to have a thickness of about 3 to 30μ and preferably about 5 to 20μ.

Disazo compounds used in the light-sensitive materials (1) and (2) are pulverized by means of a disperser such as, for example, a ball mill, a sand mill or a vibration mill so as to have a particle size of about 0.01 to 5μ and preferably 0.01 to 2μ.

If the amount of the disazo compounds used in the electrophotographic light-sensitive material of type (1) is too large, its sensitivity is reduced. If it is too small, the charging properties are adversely affected or the strength of the electrophotographic light-sensitive layer is reduced. Accordingly, the amount of the disazo compounds in the electrophotographic light-sensitive layer is preferred to be in a range of about 0.01 to 5 times the amount of the binder by weight and more preferably about 0.05 to 3 times the amount of the binder by weight. The amount of the electric charge carrier transfer compound added is preferred to be in a range of about 0.1 to 2 times the amount of the binder by weight and more preferably about 0.3 to 1.3 times the amount of the binder by weight. When using an electric charge carrier transfer compound which can be used as a binder itself, the amount of the disazo compounds is preferred to be in a range of about 0.01 to 0.5 times the amount of the electric charge carrier transfer compound by weight.

When forming a disazo compound containing layer which is an electric charge carrier generating layer in an electrophotographic light-sensitive material of type (2), the amount of the disazo compounds used is preferred to be at least about 0.1 times the amount of the binder resin by weight. If it is less than the above-described amount, sufficient light sensitivity cannot be obtained. The amount of the electric charge carrier transfer compound in the electric charge carrier transfer medium is preferred to be in a range of about 0.2 to 2 times the amount of the binder by weight and preferably about 0.3 to 1.3 times the amount of the binder by weight. When using a high polymer electric charge carrier transfer compound which can be used as a binder itself, it is not necessary to use other binders.

Further, in the electrophotographic light-sensitive material of type (2), the electric charge carrier transfer compound can be contained in the electric charge carrier generating layer in an amount of about 0.001 to 10 times by weight and preferably 0.01 to 2 times by weight as much as the disazo compound.

In producing the electrophotographic light-sensitive material of the present invention, additives such as plasticizers or sensitizers may be used together with the binder.

Electrically conductive bases, binders, plasticizers and sensitizers which can be used in the present invention are described in, for example, *Research Disclosure*, 10938 (1970).

Electrically conductive bases used in the electrophotographic light-sensitive materials of the present invention include plates of metal such as aluminum, copper or zinc, plastic sheets or plastic films, for example, of polyester, to which an electrically conductive material such as aluminum, indium oxide, tin oxide, palladium or copper iodide is applied by vacuum evaporation or by dispersing, and papers which are subjected to conductive processing. Preferred examples of the electrically conductive bases include an aluminum plate and a plastic film to which aluminum, indium oxide or tin oxide is applied by evaporation or by dispersing.

Binders include condensation type resins such as polyamide, polyurethane, polyester, epoxy resin, polyketone or polycarbonate, and vinyl polymers such as polyvinyl ketone, polystyrene, poly-N-vinylcarbazole or polyyacrylamide. However, it is possible to use any resins having an insulating property and an adhesive property. Of these, polyester, polyurethane and polycarbonate are preferred.

Examples of plasticizers include biphenyl, chlorobiphenyl, o-terphenyl, p-terphenyl, dibutyl phthalate, dimethylglycol phthalate, dioctyl phthalate, triphenyl phosphate, methylnaphthalene, benzophenone, chlorinated paraffin, polypropylene, polystyrene, dilaurylthiodipropionate, 3,5-dinitrosalicylic acid and various fluorohydrocarbons. Of these, dibutylphthalate and dioctylphthalate are preferred.

In addition, silicone oils may be added in order to improve the surface properties of the electrophotographic light-sensitive materials.

Examples of sensitizers include chloranil, tetracyanoethylene, Methyl Violet, Rhodamine B, cyanine dyes, merocyanine dyes, pyrylium dyes and thiapyrylium dyes. Of these, chloranil, pyrylium dyes and thiapyrylium dyes are preferred.

Compounds which transfer the electric charge carrier are classified generally into either compounds which transfer electrons or compounds which transfer holes. In the electrophotographic light-sensitive materials of the present invention, both types can be used. Compounds which transfer electrons include compounds having electron attractive moieties, examples of which include 2,4,7-trinitro-9-fluorenone, 2,4,5,7-tetranitro-9-fluorenone, 9-dicyanomethylene-2,4,7-trinitrofluorenone, 9-dicyanomethylene-2,4,5,7-tetranitrofluorenone, tetranitrocarbazole chloranil, 2,3-dichloro-5,6-dicyanobenzoquinone, 2,4,7-trinitro-9,10-phenanthrenequinone, tetrachlorophthalic acid anhydride, tetracyanoethylene and tetracyanoquinodimethane.

Compounds which transfer holes include compounds having electron donative moieties, for example, high polymers including:

(1) Polyvinylcarbazole and derivatives thereof described in Japanese Patent Publication No. 10966/59,
(2) Vinyl polymers described in U.S. Pat. Nos. 3,232,755 and 3,162,532, such as polyvinylpyrene, polyvinyl anthracene, poly-2-vinyl-4-(4'-dimethylaminophenyl)-5-phenyl-oxazole or poly-3-vinyl-N-ethylcarbazole,
(3) Polymers described in U.S. Pat. No. 3,169,060, such as polyacenaphthylene, polyindene or a copolymer of acenaphthylene and styrene.
(4) Condensation resins described in U.S. Pat. Nos. 3,842,038 and 3,881,922, such as pyrene-formaldehyde resin, bromopyrene-formaldehyde resin or ethylcarbazoleformaldehyde resin, and
(5) Various triphenylmethane polymers described in Japanese Patent Application (OPI) Nos. 90833/81 and 161550/81.

Examples of low molecular compounds which transfer holes include:
(6) Triazole derivatives described in U.S. Pat. No. 3,112,197,
(7) Oxadiazole derivatives described in U.S. Pat. No. 3,189,447,
(8) Imidazole derivatives described in Japanese Patent Publication No. 16096/62,
(9) Polyarylalkane derivatives described in U.S. Pat. Nos. 3,615,402, 3,820,989, 3,542,544, 3,542,547, 3,963,799 and 4,127,412, and Japanese Patent Application (OPI) Nos. 17105/80, 4148/81, 108667/80, 156953/80 and 36656/81,
(10) Pyrazoline derivatives and pyrazolone derivatives described in U.S. Pat. Nos. 3,180,729, 4,278,746 and 3,837,851, and Japanese Patent Application (OPI) Nos. 88064/80, 88065/80, 51086/80, 80051/81, 88141/81, 45545/82, 112637/79 and 74546/80,
(11) Phenylenediamine derivatives described in U.S. Pat. No. 3,615,404, Japanese Patent Publication No. 10105/76, Japanese Patent Application (OPI) Nos. 83435/79, 110836/79 and 119925/79, and Japanese Patent Publication Nos. 3712/71 and 28336/72,
(12) Arylamine derivatives described in U.S. Pat. No. 3,567,450, Japanese Patent Publication No. 35702/74, German Patent (DAS) No. 1,110,518, U.S. Pat. Nos. 3,180,703, 3,240,597, 3,658,520, 4,232,103, 4,175,961 and 4,012,376, Japanese Patent Application (OPI) Nos. 144250/80 and 119132/81, Japanese Patent Publication No. 27577/64, and Japanese Patent Application (OPI) No. 22437/81,
(13) Amino substituted chalcone derivatives described in U.S. Pat. No. 3,526,501,
(14) N,N-Bicarbazyl derivatives described in U.S. Pat. No. 3,542,546,
(15) Oxazole derivatives described in U.S. Pat. No. 3,257,203,
(16) Styrylanthracene derivatives described in Japanese Patent Application (OPI) No. 46234/81,
(17) Fluorenone derivatives described in Japanese Patent Application (OPI) No. 110837/79,
(18) Hydrazine derivatives described in U.S. Pat. No. 3,717,462, Japanese Patent Application (OPI) Nos. 59143/79 (corresponding to U.S. Pat. No. 4,150,987), 52063/80, 52064/80, 46760/80, 85495/80, 64244/82, 11350/82 and 148749/82, and
(19) Azine compounds described in Japanese Patent Application (OPI) Nos. 90634/82 and 132240/83.

Of these, polyvinylcarbazoles, triphenylmethane polymers, oxadiazole derivatives, polyarylalkane derivatives, pyrazoline derivatives, arylamine derivatives and hydrazone derivatives are preferred.

In the present invention, the compounds which Fdescribed above, an adhesive layer or a barrier layer can be provided between the electrically conductive base and the light-sensitive layer, if desired. Materials used for such layers include polyamide, nitrocellulose and aluminum oxide. These layers preferably have a thickness of about 1 μm or less.

The electrophotographic light-sensitive materials of the present invention generally have high sensitivity and excellent durability.

The electrophotographic light-sensitive materials of the present invention can be widely applied in the field of light-sensitive materials, including electrophotographic copying machines and printers using laser or a Braun tube.

The photoconductive compositions containing disazo compounds of the present invention can be used as the photoconductive layer of a video camera tube or as the photoconductive layer of solid camera elements having a light receiving layer (photoconductive layer) provided on the entire face of a semiconductor circuit primarily or secondarily arranged, by which transfer or scanning of signals is carried out.

Further, they can be used as the photoconductive layer of solar cells as described in A. K. Ghosh, Tom Feng., *J. Appl. Phys.* 49 (12) 5982 (1978).

Further, as disclosed in Japanese Patent Publication No. 17162/62, Japanese Patent Application (OPI) Nos. 19063/80 and 161250/80 and U.S. patent application Ser. No. 356,541, the disazo compounds of the present invention may be dispersed in an alkali soluble resin solution such as phenol resin, together with the above-described electric charge carrier transfer compound such as an oxadiazole derivative or a hydrazone derivative, and applied to a conductive base such as aluminum. After drying, it is subjected to imagewise exposure, toner development and etching with an aqueous solution of alkali to produce a printing plate having high resolving power, high durability and high sensitivity. Further, printed circuits can be produced.

In the following, the present invention is illustrated in detail with reference to Examples, but the present invention is not to be construed as being limited thereto. In the Examples, all parts, ratios and percents are by weight.

EXAMPLE 1

1 part of Disazo Compound (1), 5 parts of 4,4'-bis(diethylamino)-2,2'-dimethyltriphenyl methane and 5 parts of polycarbonate of bisphenol A (MW:30,000) were added to 95 parts of dichloromethane, and the mixture was pulverized in a ball mill for 1 hour to prepare a coating solution. This coating solution was applied to an electrically conductive transparent base (a 100 μm polyethylene terephthalate film having an indium oxide deposition film (about 0.5μ thick) on the surface thereof; surface resistance: $10^3 \Omega$) using a round wire rod and dried to prepare an electrophotographic light-sensitive material having a monolayer type electrophotographic light-sensitive layer having a thickness of about 9 μm.

This electrophotographic light-sensitive material was electrically charged to +450 V by corona discharging at +5 KV using an electrostatic copying paper testing apparatus (type SP-428, produced by Kawaguchi Denki Co.), and it was exposed to light with a tungsten lamp having a color temperature of 3,000° K. to 2 luxes at the surface. When the half decay exposure $E_{50}$ (lux·sec) was measured by determining the time necessary to reduce the surface electric potential to half of the initial surface electric potential, it was 5 (lux·sec). This value of $E_{50}$ was not significantly changed after two steps of electric charging and exposure were repeated 3,000 times.

This electrophotographic light-sensitive material was installed in a commercially available electrophotographic copying machine. When a copying test was carried out using an original containing red letters, a clear copying image having good contrast which was faithful to the original was obtained.

EXAMPLES 2 TO 13

Electrophotographic light-sensitive materials having a monolayer construction were produced in the same manner as in Example 1, except that Disazo Compounds (2), (4), (11), (14), (17), (23), (26), (27), (32), (35), (36) and (38) were used instead of the Disazo Compound (1), respectively. Half decay exposure by positive electric charging was measured by the same manner as in Example 1 to obtain the values shown in Table 2.

TABLE 2

| Example | Disazo Compound | $E_{50}$ (lux · sec) |
| --- | --- | --- |
| 2 | 2 | 4.3 |
| 3 | 4 | 2.6 |
| 4 | 11 | 10 |
| 5 | 14 | 9.8 |
| 6 | 17 | 6.6 |
| 7 | 23 | 3.5 |
| 8 | 26 | 13 |
| 9 | 27 | 4.6 |
| 10 | 32 | 3.1 |
| 11 | 35 | 26 |
| 12 | 36 | 14 |
| 13 | 38 | 18 |

EXAMPLE 14

5 g of Disazo Compound (1) was dispersed in a solution prepared by dissolving 2 g of polyvinyl butyral resin (MW: 50,000; butyral value: 63% by mol) in 100 ml of THF, followed by processing in a ball mill for 20 hours. The dispersion was applied to an electroconductive base (a 100 μm polyethylene terephthalate film having an aluminum deposition film (about 0.5μ thick) on the surface thereof; surface electric resistance: $10^3 \Omega$) using a round wire rod, and dried to form an electric charge generating layer having a thickness of 1 μm.

To the electric charge generating layer, a solution prepared by dissolving 2 parts of p-(diphenylamino)benzaldehyde-N'-methyl-N'-phenylhydrazone

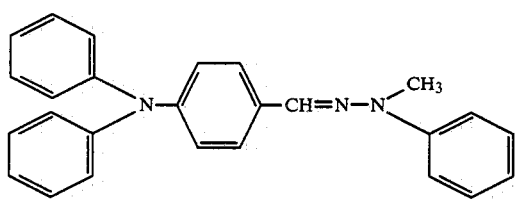

and 4 parts of polycarbonate of bisphenol A (MW: 30,000) in 60 parts of dichloromethane was applied using a round wire rod, and dried to form an electric charge transfer layer having a thickness of 15 μm, to prepare an electrophotographic light-sensitive material having a two layer electrophotographic light-sensitive layer.

After this light-sensitive material was electrically charged to −700 V by corona discharging at −5 KV, the half-decay exposure was measured as in Example 1, and $E_{50}$ was 2.3 (lux·sec).

EXAMPLES 15 TO 26

Electrophotograpic light-sensitive materials having a two layer construction were produced by the same manner as in Example 14, except that Disazo Compounds (2), (3), (5), (6), (8), (9), (10), (17), (21), (23), (36) and (37) were used instead of Disazo Compound (1), respectively, and $E_{50}$ was measured, with the results shown in Table 3.

TABLE 3

| Example | Disazo Compound | $E_{50}$ (lux · sec) |
| --- | --- | --- |
| 15 | 2 | 1.7 |
| 16 | 3 | 1.9 |
| 17 | 5 | 2.3 |
| 18 | 6 | 1.7 |
| 19 | 8 | 2.3 |
| 20 | 9 | 2.7 |
| 21 | 10 | 5.4 |
| 22 | 17 | 3.6 |
| 23 | 21 | 7.8 |
| 24 | 23 | 13.0 |
| 25 | 36 | 5.6 |
| 26 | 37 | 3.2 |

EXAMPLE 27

An electric charge transfer layer having a thickness of 19 μm was formed on an electric charge generating layer having a thickness of 1 μm in the same manner as in Example 14, except that 4 parts of 2,4,7-trinitro-9-fluorenone were used instead of p-(diphenylamino)benzaldehyde-N'-methyl-N'-phenylhydrazone in the electric charge transfer layer.

This electrophotographic light-sensitive material was electrically charged to +1,000 V by corona discharging at +5 KV. When $E_{50}$ was measured, it was 2.1 (lux·sec).

EXAMPLES 28 TO 31

Electrophotographic light-sensitive materials having a two layer construction were produced in the same manner as in Example 27, except that Disazo Compounds (9), (12), (22) and (33) were used instead of Disazo Compound (1), respectively. $E_{50}$ was measured, the the results are shown in Table 4.

TABLE 4

| Example | Disazo Compound | $E_{50}$ (lux · sec) |
| --- | --- | --- |
| 28 | 9 | 5.6 |
| 29 | 12 | 2.1 |
| 30 | 22 | 3.8 |
| 31 | 33 | 10 |

EXAMPLE 32

1 part of Disazo Compound (1) and 1 part of polycarbonate of bisphenol A (MW: 30,000) were added to 25 parts of dichloromethane, and the mixture was pulverized by blending in a ball mill for 1 hour to prepare a coating solution. This coating solution was applied to an electrically conductive base (a 100 μm polyethylene terephthalate film having an aluminum deposition film (about 0.5μ thick) on the surface thereof; surface resistance: $10^3 \Omega$) using a round wire rod, and dried to obtain an electrophotographic light-sensitive material having a monolayer type electrophotographic light-sensitive layer having a thickness of about 2 μm.

This electrophotographic light-sensitive material was electrically charged to +100 V by corona discharging at +5 KV. When $E_{50}$ was measured, it was 5.9 (lux·sec).

EXAMPLES 33 TO 36

Monolayer type electrophotographic light-sensitive materials were produced in the same manner as in Example 32, except that Disazo Compounds (11), (15), (18) and (29) were used instead of Disazo Compound (1), respectively. $E_{50}$ was measured, and the results are shown in Table 5.

TABLE 5

| Example | Disazo Compound | $E_{50}$ (lux · sec) |
|---|---|---|
| 33 | 11 | 9.0 |
| 34 | 15 | 3.2 |
| 35 | 18 | 8.3 |
| 36 | 29 | 4.5 |

EXAMPLE 37

1 part of disazo Compound (1), 1 part of p-(diphenylamino)benzaldehyde-N'-methyl-N'-phenylhydrazone and 6 parts of m-cresol-formaldehyde resin (MW: 50,000) were added to 30 parts of ethylene glycol monomethyl ether, and the mixture was pulverized by blending in a ball mill for 1 hour. The resulting coating solution was applied to an aluminum plate having a thickness of about 0.25 mm which was subjected to graining, anodic oxidation and sealing processing, using a round wire rod, and dried at 90° C. for 10 minutes and at 50° C. for 1 day to produce a sample having a coating thickness of about 6 μm.

Then this sample was subjected to corona discharging in the dark to a surface electric potential of 500 V. After exposed to a negative image using a tungsten light (300 lux·second), reversal development was carried out using Mitsubishi Diafax master LOM-ED toner (produced by Mitsubishi Paper Mills, Co.), by which a very clear positive image was obtained on the printing base plate. This printing base plate was immersed in a 10% solution of etching solution DP-1 (an aqueous solution of sodium silicate, produced by Fuji Photo Film Co.) for 1 minute to remove the non-image portion light-sensitive layer where the toner did not adhere, by dissolution. As a result, the pigment in the non-image portion of the plate was easily removed together with the binder, and a printing plate having a clear image was obtained.

While the invention has been described in detail and with reference to specific embodiments thereof, it will be apparent to one skilled in the art that various changes and modifications can be made therein without departing from the spirit and scope thereof.

What is claimed is:

1. A photoconductive composition comprising at least one disazo compound represented by the following general formula (I):

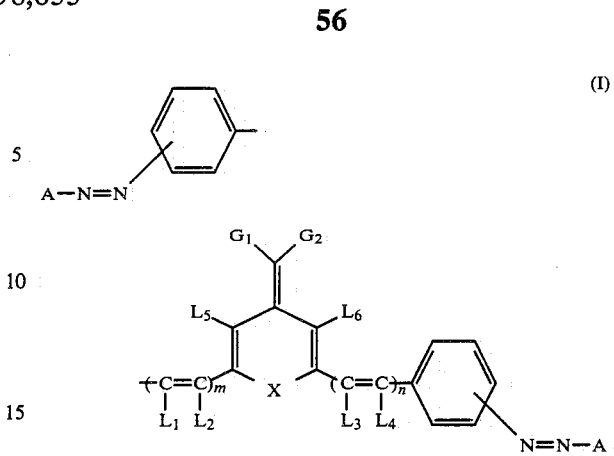

wherein
X represents O, S, Se or NR, wherein R represents a substituted or unsubstituted alkyl, aryl, aralkyl, cycloalkyl, alkoxy, aryloxy, acyl, alkenyl, alkynyl or alkylene group, and the substituent is hydroxy, alkoxy, aryloxy or halogen;
m and n, which may be the same or different, each represents 0, 1 or 2;
$L_1$, $L_2$, $L_3$ and $L_4$, which may be the same or different, each represents a hydrogen atom, an alkyl group or an aryl group, or $L_2$ or $L_3$ represents an atomic group necessary to complete a carbon ring together with $L_5$ or $L_6$;
$L_5$ and $L_6$ each represents a hydrogen atom or an atomic group necessary to complete a carbon ring together with $L_2$ or $L_3$;
$G_1$ and $G_2$, which may be the same or different, each represents an electron attracting group or a non-metal atomic group necessary to form a carbon or heterocyclic ring including the carbon atom to which $G_1$ and $G_2$ are bonded;
provided that when $G_1$ and $G_2$ form a cyclic carbon nucleus or a heterocyclic nucleus together with the carbon atom to which they are bonded, the ring formed may be substituted with a substituent selected from the group consisting of substituted or unsubstituted alkyl, aryl, aralkyl, cycloalkyl, alkenyl, alkynyl, dialkylamino, diarylamino and diaralkylamino groups;
A represents

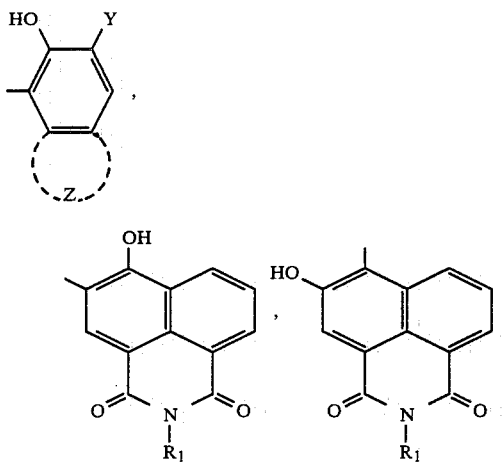

-continued

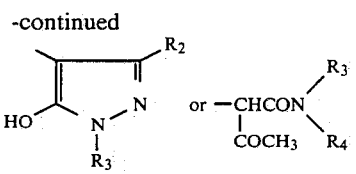

wherein Z represents an atomic group necessary to form an aromatic ring or a heterocyclic ring (which may be substituted or unsubstituted) said ring being condensed with the benzene ring;
Y represents

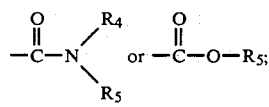

R₁ represents a hydrogen atom, a substituted or unsubstituted alkyl group or a substituted or unsubstituted phenyl group;

R₂ represents a hydrogen atom, a lower alkyl group, a carbamoyl group, a carboxyl group, an alkoxycarbonyl group, an aryloxycarbonyl group or a substituted or unsubstituted amino group;

R₃ and R₅ each represents a hydrogen atom, an alkyl group, an aromatic group, a heteroaromatic group, or an alkyl, aromatic or heteroaromatic substituted group; and R₄ represents a hydrogen atom, a substituted or unsubstituted alkyl group or a substituted or unsubstituted phenyl group.

2. The photoconductive composition as claimed in claim 1, wherein X is O or S.

3. The photoconductive composition claimed in claim 1, wherein said electron attracting group is selected from the group consisting of a cyano group, an acyl group having 2 to 10 carbon atoms, an alkoxycarbonyl group having 2 to 10 carbon atoms, a nitroaryl group having 6 to 15 carbon atoms, an alkylsulfonyl group having 1 to 10 carbon atoms and an arylsulfonyl group having 6 to 15 carbon atoms.

4. The photoconductive composition claimed in claim 1, wherein said electron attracting group is selected from the group consisting of a cyano group, an acyl group having 2 to 5 carbon atoms, an alkoxycarbonyl group having 2 to 5 carbon atoms, a nitroaryl group having 6 to 10 carbon atoms, an alkylsulfonyl group having 1 to 5 carbon atoms and an arylsulfonyl group having 6 to 10 carbon atoms.

5. The photoconductive composition claimed in claim 1, wherein said ring referred to in the definition of G₁ and G₂ is a substituted or unsubstituted acid carbocyclic nucleus used for merocyanine dyes.

6. The photoconductive composition claimed in claim 5, wherein said acid carbocyclic nucleus is selected from the group consisting of 1,3-indanedione, 1,3-cyclohexanedione, 5,5-dimethyl-1,3-cyclohexanedione and 1,3-dioxane-4,6-dione.

7. The photoconductive composition claimed in claim 1, wherein said ring is a substituted or unsubstituted heterocyclic nucleus.

8. The photoconductive composition claimed in claim 7, wherein said heterocyclic nucleus is selected from the group consisting of a pyrazolinone nucleus, an isoxazolinone nucleus, a hydroxyindole nucleus, a 2,4,6-triketohexahydropyrimidine nucleus, a 2-thio-2,4-thiazolidinedione nucleus, a 2-thio-2,4-oxazolidinedione nucleus, a thianapthenone nucleus, a 2-thio-2,5-thiazolidinedione nucleus, a 2,4-thiazolidinedione nucleus, a thiazolidinone nucleus, a 4-thiazolinone nucleus, a 2-imino-2-oxazoline-4-one pseudohydantoin nucleus, a 2-thio-2,4-imidazolidinedione, a 2-imidazoline-5-one nucleus, a furan-5-one nucleus, and a heterocyclic nucleus containing 3 carbon atoms, a nitrogen atom and a hetero atom selected from the group consisting of nitrogen, oxygen and sulfur.

9. The photoconductive composition claimed in claim 7, wherein said ring is substituted with at least one group selected from the group consisting of a hydroxyl group, an alkoxy group having 1 to 10 carbon atoms and an aryloxy group having 6 to 15 carbon atoms.

10. The photoconductive composition claimed in claim 9, wherein said ring is substituted with at least one group selected from the group consisting of an alkoxy group having 1 to 5 carbon atoms.

11. The photoconductive compositon claimed in claim 9, wherein said at least one group is selected from the group consisting of a carboxymethyl group, a 5-carboxypentyl group, a 2-sulfoethyl group, a 3-sulfatopropyl group, a 3-thiosulfatopropyl group, a 2-phosphonoethyl group, a 3-sulfobutyl group, a 4-sulfobutyl, a 4-carboxyphenyl group and a 4-sulfophenyl group.

12. The photoconductive composition claimed in claim 3, wherein said electron attracting group is a cyano group.

13. The photoconductive composition claimed in claim 5, wherein said ring is selected from the group consisting of a 1,3-indanedione nucleus, a 1,3-diethylbarbituric acid nucleus, a 1,3-diethyl-2-thiobarbituric acid nucleus, a 3-phenyl-2-isoxazoline-5-one nucleus and a 3-methyl-1-phenyl-2-pyrazoline-5-one nucleus.

14. The photoconductive compositionclaimed in claim 1, wherein said alkyl group has 1 to 10 carbon atoms.

15. The photoconductive composition claimed in claim 14, wherein said alkyl group has 1 to 5 carbon atoms.

16. The photoconductive composition claimed in claim 1, wherein said aryl group has 6 to 15 carbon atoms.

17. The photoconductive composition claimed in claim 16, wherein said aryl group has 6 to 10 carbon atoms.

18. The photoconductive composition claimed in claim 1, wherein A represents

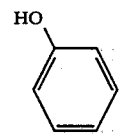

19. The photoconductive composition claimed in claim 1, wherein Z represents an atomic group capable of forming a condensed ring system with the benzene ring selected from the group consisting of a naphthalene ring, a carbazole ring, a benzocarbazole ring and a dibenzofuran ring.

20. The photoconductive composition claimed in claim 1, wherein R₁ represents an alkyl group having 1 to 12 carbon atoms.

21. The photoconductive composition claimed in claim 1, wherein said alkyl group is substituted with a substituent selected from the group consisting of a hydroxyl group, an alkoxy group having 1 to 12 carbon atoms, a cyano group, an amino group, an alkylamino group having 1 to 12 carbon atoms, a dialkylamino group having 1 to 12 carbon atoms in each alkyl moiety, a halogen atom and an aryl group having 6 to 14 carbon atoms.

22. The photoconductive composition claimed in claim 1, wherein said phenyl group is substituted with a substituent selected from the group consisting of a hydroxyl group, an alkoxy group having 1 to 12 carbon atoms, a cyano group, an amino group, an alkylamino group having 1 to 12 carbon atoms, a dialkylamino group having 1 to 12 carbon atoms in each alkyl moiety, a halogen atom, an alkyl group having 1 to 6 carbon atoms and a nitro group.

23. The photoconductive composition claimed in claim 1, wherein $R_1$ is a group selected from the group consisting of a methoxyphenyl group, a dimethylaminophenyl group, a chlorophenyl group and a tolyl group.

24. The photoconductive composition claimed in claim 1, wherein $R_2$ represents a hydrogen atom, an alkyl group having 1 to 6 carbon atoms, a carbamoyl group, a carboxyl group, an alkoxycarbonyl group having 1 to 12 carbon atoms, an aryloxycarbonyl group having 6 to 20 carbon atoms and a substituted or unsubstituted amino group.

25. The photoconductive composition claimed in claim 24, wherein $R_2$ represents a group selected from the group consisting of an emthylamino group, an ethylamino group, a dimethylamino group, a diethylamino group, a methyl group, an ethyl group, a propyl group, a butyl group, a methoxycarbonyl group, an ethoxycarbonyl group and a phenoxycarbonyl group.

26. The photoconductive composition claimed in claim 1, wherein $R_3$ and $R_5$ each represents a hydrogen atom, an alkyl group having 1 to 20 carbon atoms, a condensed or uncodensed 6-membered aromatic group having 6 to 18 carbon atoms and a condensed or uncodensed 5- or 6-membered heteroaromatic group.

27. The photoconductive composition claimed in claim 26, wherein said alkyl group is substituted with a substituent selected from the group consisting of a hydroxy group, an alkoxy group having 1 to 12 carbon atoms, a cyano group, an amino group, an alkylamino group having 1 to 12 carbon atoms, a dialkylamino group having 1 to 12 carbon atoms in each alkyl moiety, a halogen atom and an aryl group having 6 to 15 carbon atoms.

28. The photoconductive composition claimed in claim 26, wherein said aromatic ring or heteroaromatic group is substituted with 1 to 3 substituents selected from the group consisting of a hydroxyl group, a cyano group, a nitro group, a halogen atom, an alkyl group having 1 to 12 carbon atoms, an alkoxy group having 1 to 12 carbon atoms, an amino group, an alkylamino group having 1 to 12 carbon atoms, a dialkylamino group having 1 to 12 carbon atoms in each alkyl moiety, an arylamino group having 6 to 12 carbon atoms, a diarylamino group having 6 to 15 carbon atoms in each aryl moiety, a carboxyl group, an alkali metal carboxylate group, an alkali metal sulfonate group, an alkylcarbonyl group having 2 to 20 carbon atoms, an arylcarbonyl group having 6 to 12 carbon atoms in the aryl moiety, an alkylthio group having 1 to 12 carbon atoms and an arylthio group having 6 to 12 carbon atoms.

29. The photoconductive composition claimed in claim 1, wherein $R_3$ and $R_5$ each represents a group selected from the group consisting of a hydroxyphenyl group, a hydroxynaphthyl group, a chlorophenyl group, a chloronaphthyl group, a bromophenyl group, a bromodibenzofuranyl group, a bromocarbazolyl group, a carboxymethylphenyl group, a carboxymethyldibenzofuranyl group and a carboxymethylcarbazolyl group.

30. The photoconductive coposition claimed in claim 1, wherein said alkyl group represented by $R_4$ has 1 to 20 carbon atoms.

31. The photoconductive composition claimed in claim 1, wherein $R_4$ represents a group selected from the group consisting of a phenyl group, a naphthyl group, a dibenzofuranyl group, a carbazolyl group, a bromophenyl group, a bromodibenzofuranyl group and a bromocarbazolyl group.

32. The photoconductive composition claimed in claim 1, wherein Y represents

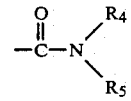

wherein $R_4$ and $R_5$ have the same meanings as defined above.

33. An electrophotographic light-sensitive material comprising an electrically conductive base and an electrophotographic light-sensitive layer containinng the disazo compound claimed in claim 1.

34. The electrophotographic light-sensitive material claimed in claim 33, wherein said electrophotographic light-sensitive layer contains said disazo compound dispersed in a binder containing an electric charge transfer medium.

35. The electrophotographic light-sensitive material claimed in claim 33, wherein said disazo compound and an optional binder are contained in an electric charge generating layer provided on said electrically conductive base and an electric charge transfer medium layer containing an electric charge transfer compound and an optional binder is provided on said electric charge generating layer.

36. The electrophotographic light-sensitive material claimed in claim 35, wherein said optional electric charge transfer compound is present in said electric charge generating layer.

37. The electrophotographic light-sensitive material claimed in claim 34, wherein said electrophotographic light-sensiitive layer has a thickness of about 5 to 30μ.

38. The electrophotographic light-sensitive material claimed in claim 37, wherein said electrophotographic light-sensitive layer has a thickness of about 5 to 20μ.

39. The electrophotographic light-sensitive material claimed in claim 35, wherein said electric charge generating layer has a thickness of from about 0.01μ to 4μ and said electric charge transfer medium layer has a thickness of about 3 to 30μ.

40. The electrophotographic light-sensitive material claimed in claim 39, wherein said electric charge generating layer has a thickness of from about 0.01 to 2μ and said electric charge transfer medium layer has a thickness of from about 5 to 20μ.

41. The electrophotographic light-sensitive material claimed in claim 33, wherein said disazo compound has a particle size of about 0.01μ to 5μ.

42. The electrophotographic light-sensitive material claimed in claim 33, wherein said disazo compound has a particle size of from about 0.01μ to 2μ.

43. The electrophotographic light-sensitive material claimed in claim 34, wherein said disazo compound is present in an amount from about 0.01 to 5 times the amount of said binder by weight and said electric charge transfer medium is present in an amount of from about 0.1 to 2 times the amount of said binder by weight.

44. The electrophotographic light-sensitive material claimed in claim 43, wherein said disazo compound is present in an amount of from about 0.05 to 3 times the amount of said binder by weight, and said electric charge transfer medium is present in an amount of from about 0.3 to 1.3 times the amount of said binder by weight.

45. The electrophotographic light-sensitive material claimed in claim 33, wherein said electrophotographic light-sensitive layer contains said disazo compound dispersed in an electric charge transfer medium.

46. The electrophotographic light-sensitive material claimed in claim 45, wherein said disazo compound is present in an amount of from about 0.01 to 0.5 times the amount of said electric charge transfer medium.

47. The electrophotographic light-sensitive material claimed in claim 35, wherein said disazo compound is present in an amount of at least about 0.1 times the amount of said binder, and said electric charge transfer medium is present in an amount of from about 0.2 to 2 times the amount of said binder by weight.

* * * * *